(12) United States Patent
Sagisaka

(10) Patent No.: US 10,253,939 B2
(45) Date of Patent: Apr. 9, 2019

(54) LIGHTING DEVICE FOR VEHICLE

(71) Applicant: ICHIKOH INDUSTRIES, LTD., Isehara-shi, Kanagawa-ken (JP)

(72) Inventor: Toshio Sagisaka, Isehara (JP)

(73) Assignee: ICHIKOH INDUSTRIES, LTD., Isehara-Shi (JP)

( * ) Notice: Subject to any disclaimer, the term of this patent is extended or adjusted under 35 U.S.C. 154(b) by 0 days.

(21) Appl. No.: 15/301,838

(22) PCT Filed: Mar. 24, 2015

(86) PCT No.: PCT/JP2015/058973
§ 371 (c)(1),
(2) Date: Oct. 4, 2016

(87) PCT Pub. No.: WO2015/156122
PCT Pub. Date: Oct. 15, 2015

(65) Prior Publication Data
US 2017/0023203 A1    Jan. 26, 2017

(30) Foreign Application Priority Data

Apr. 8, 2014 (JP) .................................. 2014-079584

(51) Int. Cl.
*F21S 41/255* (2018.01)
*F21S 41/20* (2018.01)
(Continued)

(52) U.S. Cl.
CPC .......... *F21S 41/285* (2018.01); *B60Q 1/0064* (2013.01); *F21S 41/147* (2018.01);
(Continued)

(58) Field of Classification Search
CPC .......... B64D 47/02; B63B 45/00; B61D 29/00
See application file for complete search history.

(56) References Cited

U.S. PATENT DOCUMENTS 2,166,685 A * 7/1939 Henderson .............. H01J 19/36
165/80.3
4,562,519 A * 12/1985 Deves ................. F21S 48/1258
362/308

(Continued)

FOREIGN PATENT DOCUMENTS

EP    1 369 639 A1    12/2003
EP    2 320 130 A1    5/2011
(Continued)

OTHER PUBLICATIONS

Japanese Office Action received in corresponding Japanese Application No. 2014-079584, dated Oct. 25, 2017, and English translation thereof.
(Continued)

*Primary Examiner* — Andrew J Coughlin
*Assistant Examiner* — Fatima N Farokhrooz
(74) *Attorney, Agent, or Firm* — Foley & Lardner LLP

(57) ABSTRACT

A lighting device for a vehicle comprises: a semiconductor light emitting section; a projection lens for projecting light, which has been emitted from the semiconductor lighting section, in a predetermined light distribution pattern; a heat sink member having the semiconductor light emitting section mounted thereto; and a plate member provided between the projection lens and the heat sink member and having lower heat conductivity than the heat sink member. The projection lens is a resin lens. At least a part of a surface of the plate member, the surface facing the projection lens, is a lens-side diffusion surface.

9 Claims, 11 Drawing Sheets

(51) Int. Cl.
    *F21S 41/29*           (2018.01)
    *F21S 41/275*        (2018.01)
    *B60Q 1/00*           (2006.01)
    *F21S 41/147*        (2018.01)
    *F21S 41/33*          (2018.01)
    *F21S 41/43*          (2018.01)
    *F21S 45/10*          (2018.01)
    *F21S 45/47*          (2018.01)
    *F21Y 115/10*        (2016.01)
    *F21Y 115/15*        (2016.01)
    *F21S 41/60*          (2018.01)
    *F21S 41/686*        (2018.01)

(52) U.S. Cl.
    CPC ........... *F21S 41/255* (2018.01); *F21S 41/275* (2018.01); *F21S 41/29* (2018.01); *F21S 41/295* (2018.01); *F21S 41/337* (2018.01); *F21S 41/43* (2018.01); *F21S 45/10* (2018.01); *F21S 45/47* (2018.01); *F21S 41/60* (2018.01); *F21S 41/686* (2018.01); *F21Y 2115/10* (2016.08); *F21Y 2115/15* (2016.08)

(56) References Cited

U.S. PATENT DOCUMENTS

| | | | |
|---|---|---|---|
| 6,015,220 A | 1/2000 | Blusseau | |
| 6,709,139 B2* | 3/2004 | Ishida | F21S 41/43 362/509 |
| 2004/0136196 A1* | 7/2004 | Akiyama | B60Q 1/2607 362/487 |
| 2005/0180156 A1* | 8/2005 | Iwasaki | F21S 41/365 362/538 |
| 2007/0147041 A1* | 6/2007 | Shiratsuchi | F21V 5/007 362/268 |
| 2009/0003009 A1 | 1/2009 | Tessnow et al. | |
| 2009/0257240 A1* | 10/2009 | Koike | F21S 48/1159 362/538 |
| 2010/0073950 A1 | 3/2010 | Kawamura | |
| 2012/0069547 A1* | 3/2012 | Gielen | F21K 9/54 362/84 |
| 2013/0141928 A1 | 6/2013 | Puente et al. | |
| 2013/0141932 A1* | 6/2013 | Brown | F21S 48/1225 362/520 |
| 2014/0112012 A1* | 4/2014 | Nakazato | F21S 48/1159 362/510 |
| 2015/0345742 A1* | 12/2015 | Radl | F21V 7/0091 362/309 |

FOREIGN PATENT DOCUMENTS

| | | |
|---|---|---|
| EP | 2 620 693 A2 | 7/2013 |
| FR | 2687761 A1 | 8/1993 |
| JP | 2009-016347 A | 1/2009 |
| JP | 2010-129322 A | 6/2010 |
| JP | 2011-100589 A | 5/2011 |
| JP | 2013-101865 A | 5/2013 |
| JP | 2013-115046 A | 6/2013 |
| JP | 2013-131409 A | 7/2013 |

OTHER PUBLICATIONS

Supplementary European Search Report received in corresponding European Application No. 15 776088, dated Nov. 14, 2017.

* cited by examiner (a)

(b)

LIGHTING DEVICE FOR VEHICLE

TECHNICAL FIELD

The present invention relates to a lighting device for vehicle employing a semiconductor light emitting section.

BACKGROUND ART

In a lighting device for vehicle, which is employed in a vehicle, it is contemplated to employ a semiconductor light emitting section as a light source (for example, refer to Patent Literature 1). The lighting device for vehicle is configured so that: a heat sink member and a housing are formed of a material of thermal conductivity is higher so as to be integral with each other; at a setup part of the housing, a semiconductor light emitting section is provided; and at an end part on a front side in an emission direction in the housing, a projection lens is supported. In the lighting device for vehicle, the light having been emitted from the semiconductor light emitting section is emitted from the projection lens to thereby illuminate a front side in a predetermined light distribution pattern. Afterwards, in the lighting device for vehicle, a heat which is generated at the semiconductor light emitting section is radiated at the heat sink member from the setup part through the housing.

Therefore, in the lighting device for vehicle, it is possible to prevent shortening of a service life of light emission of the semiconductor light emitting section due to a temperature rise or lowering of light emission efficiency.

CITATION LIST

Patent Literature

Patent Literature 1; Japanese Unexamined Patent Application Publication No. 2009-16347

SUMMARY OF THE INVENTION

Problems to be Solved by the Invention

However, in the lighting device for vehicle mentioned above, the light to be emitted by the semiconductor light emitting section hardly has a heat and thus in order to achieve reduction of a weight as a whole, it is contemplated to employ the projection lens that is formed of a resin material in place of the one that is formed of a glass material. Here, in the lighting device for vehicle, the heat that has been generated at the semiconductor light emitting section is transmitted from the setup part to the projection lens through the housing (the supporting section) that has been integrated with the heat sink member. This circumstance entails no problem, since a heat resistance temperature of the projection lens is high in a case where the projection lens has been formed of the glass material.

However, in the projection lens that has been formed of the resin material, the heat resistance temperature thereof is low in comparison with that of the projection lens that has been formed of the glass material; and therefore, there may be a case in which, if the heat is transmitted through the housing, a deformation occurs. Therefore, in the lighting device for vehicle, if the projection lens that has been formed of the resin material has been employed, there may be a case in which the accuracy of mounting to the housing lowers due to the heat that is generated at the semiconductor light emitting section, or alternatively, there may be a case in which a failure of light distribution occurs.

The present invention has been made in view of the circumstance described above, and it is an object of the present invention to provide a lighting device for vehicle which is capable of preventing lowering of the accuracy of mounting due to a heat which is generated at a semiconductor light emitting section, even in a case where a projection lens which has been formed of a resin material has been employed.

Means for Solving the Problem

A lighting device for vehicle according to the present invention, comprising: a semiconductor light emitting section; a projection lens to radiate light emitted from the semiconductor light emitting section in a predetermined light distribution pattern; a heat sink member to which the semiconductor light emitting section is to be mounted; and a plate member which is provided between the projection lens and the heat sink member and of which thermal conductivity is lower than a thermal conductivity of the heat sink member; wherein the projection lens is a resin lens, and at the plate member, at least a part of a lens opposing surface which opposes to the projection lens is obtained as a lens-side diffusion surface.

In the lighting device for vehicle, at the plate member, a shading part to partially shade the light emitted from the semiconductor light emitting section is provided, at the plate member, the lens opposing surface at the shading part is obtained as the lens-side diffusion surface.

In the lighting device for vehicle, the lens-side diffusion surface is a longitudinally patterned roulette.

In the lighting device for vehicle, the lens-side diffusion surface is configured so that a plurality of fisheye shaped sections are arrayed in a lattice shape.

In the lighting device for vehicle, at either one of the plate member and the projection lens, a first protrusion part to form a gap between the plate member and the projection lens is provided.

In the lighting device for vehicle, to the heat sink member, a lens holder to hold the projection lens while a shade is provided in an optical path from the semiconductor light emitting section up to the projection lens is mounted, and the plate member is disposed between the projection lens and the lens holder so as to be thereby provided between the projection lens and the heat sink member.

In the lighting device for vehicle, at either one of the plate member and the lens holder, a second protrusion part to form a gap between the plate member and the lens holder is provided.

In the lighting device for vehicle, at the plate member, a light source side surface which is positioned at the semiconductor light emitting section side is obtained as a light source side diffusion surface.

In the lighting device for vehicle, the plate member has: a shading part to shade the light from the semiconductor light emitting section and an opening part to radiate the light from the semiconductor light emitting section to a front side via the projection lens, and the plate member forms an annular shape.

EFFECT OF THE INVENTION

In a lighting device for vehicle, even in a case where a projection lens that has been formed of a resin material has been employed, it is possible to prevent lowering of the accuracy of mounting due to a heat which is generated at a semiconductor light emitting section.

At the plate member, a shading part to partially shade the light that has been emitted from the semiconductor light emitting section is provided, and at the plate member, when there is a construction in which the lens opposing surface at the shading part is obtained as the lens-side diffusion surface, at the shading part of the plate member, it is possible to prevent the light (the luminous flux) that has been emitted from the semiconductor light emitting section from directly illuminating an upper part on a surface which is orthogonal to a radiation light axis.

In the lens-side diffusion surface, if a longitudinally patterned roulette is configured, it is possible to diffuse the light that travels to its own side with a simple configuration and while achieving cost reduction.

In the lens-side diffusion surface, if a plurality of fisheye shaped sections are configured to be arrayed in a lattice shape, it is possible to diffuse the light that travels to its own side with a simple configuration and while achieving cost reduction.

In either one of the plate member and the projection lens, when there is a construction in which a first protrusion part forming a gap between the plate member and the projection lens is provided, it is possible to more effectively restrain the heat of the heat sink member from being transmitted to the plate member, and it is possible to more reliably prevent the projection lens from being deformed due to the heat that has been transmitted from the heat sink member.

To the heat sink member, a lens holder to retain the projection lens while providing a shade in an optical path from the semiconductor light emitting section up to the projection lens is mounted and then the plate member is provided between the projection lens and the heat sink member by being disposed between the projection lens and the lens holder, whereby it is possible to effectively restrain the heat of the heat sink member from being transmitted to the plate member through the lens holder, and it is possible to prevent the projection lens from being deformed due to the heat that has been transmitted through the lens holder.

In either one of the plate member and the lens holder, when there is a configuration that a second protrusion part forming a gap between the plate member and the lens holder is provided, it is possible to effectively restrain the heat of the lens holder from being transmitted to the projection lens via the plate member, and it is possible to more reliably prevent the projection lens from being deformed due to the heat that has been transmitted through the lens holder.

In the plate member, if a light source side surface positioned at the semiconductor light emitting section side is configured to be obtained as a light source side diffusion surface, it is possible to significantly restrain the light quantity of the light (the luminous flux) that travels in an unintended direction due to the light (the luminous flux) that is emitted from the semiconductor light emitting section towards the light source side surface of the plate member, and it is possible to emit the light (the luminous flux) in the unintended direction from the projection lens to thereby prevent dazzling.

The plate member has: a shading part to shade the light from the semiconductor light emitting section and an opening part to radiate the light from the semiconductor light emitting section to a front side view the projection lens, and when there is a constituent element which forms an annular shape, a plate member can be provided between the projection lens and the lens holder while the plate member is simply configured.

MODE FOR CARRYING OUT THE INVENTION

Figure 1:
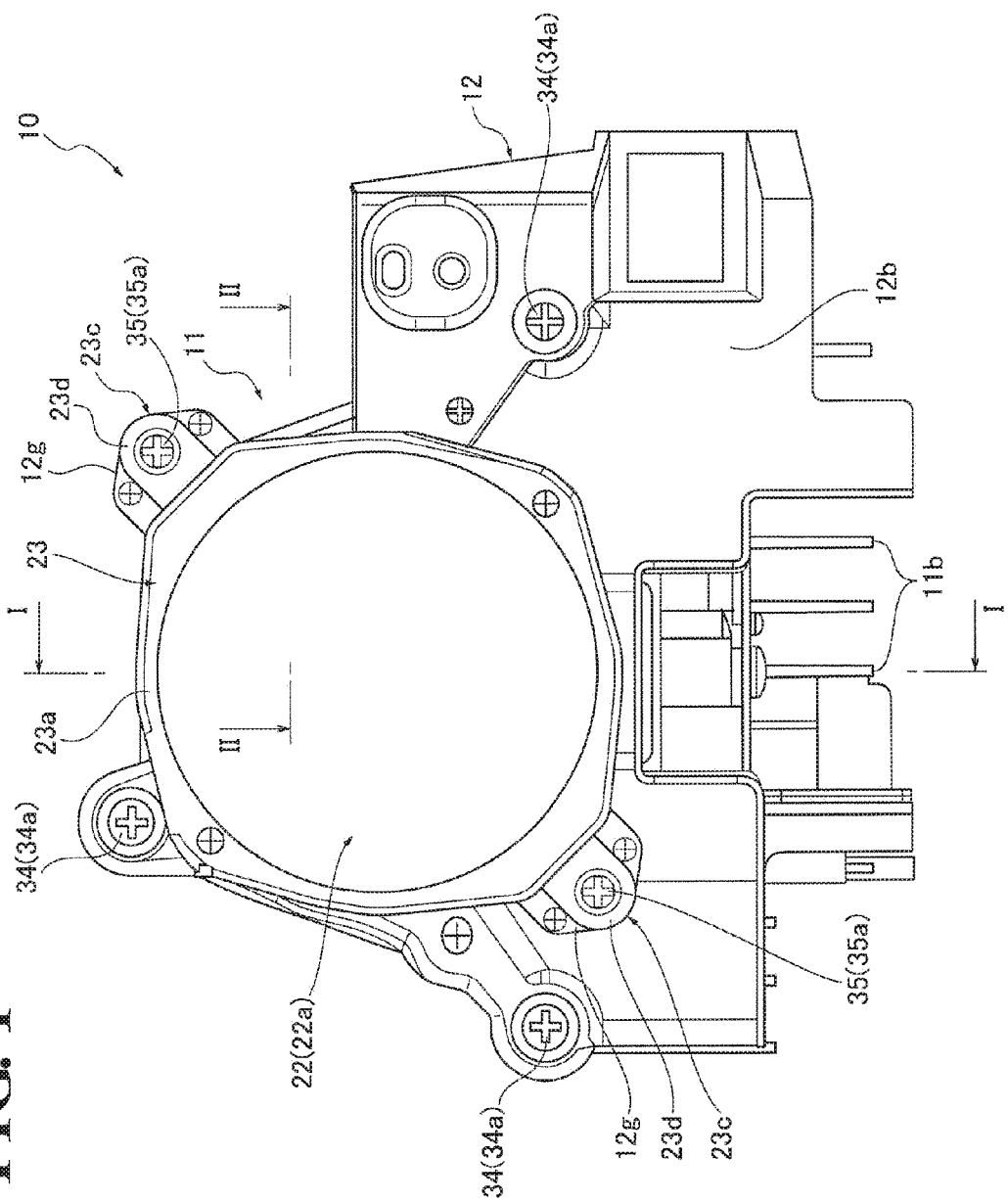
FIG. 1 is a front view showing an appearance in a case where a lighting device for vehicle 10 of a first embodiment according to the present invention is seen from a front side.

Embodiments of a lighting device for vehicle, according to the present invention, will be described with reference to the drawings.

First Embodiment

A lighting device for vehicle 10 of a first embodiment as one example of a lighting device for vehicle, according to the present invention, will be described with reference to FIG. 1 to FIG. 9. It is to be noted that, although FIG. 7 schematically shows an appearance in a case where light B7 having traveled to a light source side diffusion surface 21m provided on a light source side surface 21c of a plate member 21 is diffused, this is not always coincident with the appearance in the case where the light B7 is actually diffused. In addition, although FIG. 8 schematically shows an appearance in a case where light is multiply reflected between a back face 22c of a projection lens 22 and a lens opposing surface 21d (a lens-side diffusion surface 21h) of a shading part 21b of the plate member 21, this is not always coincident with the appearance in the case where the light is actually multiply reflected.

Figure 2:
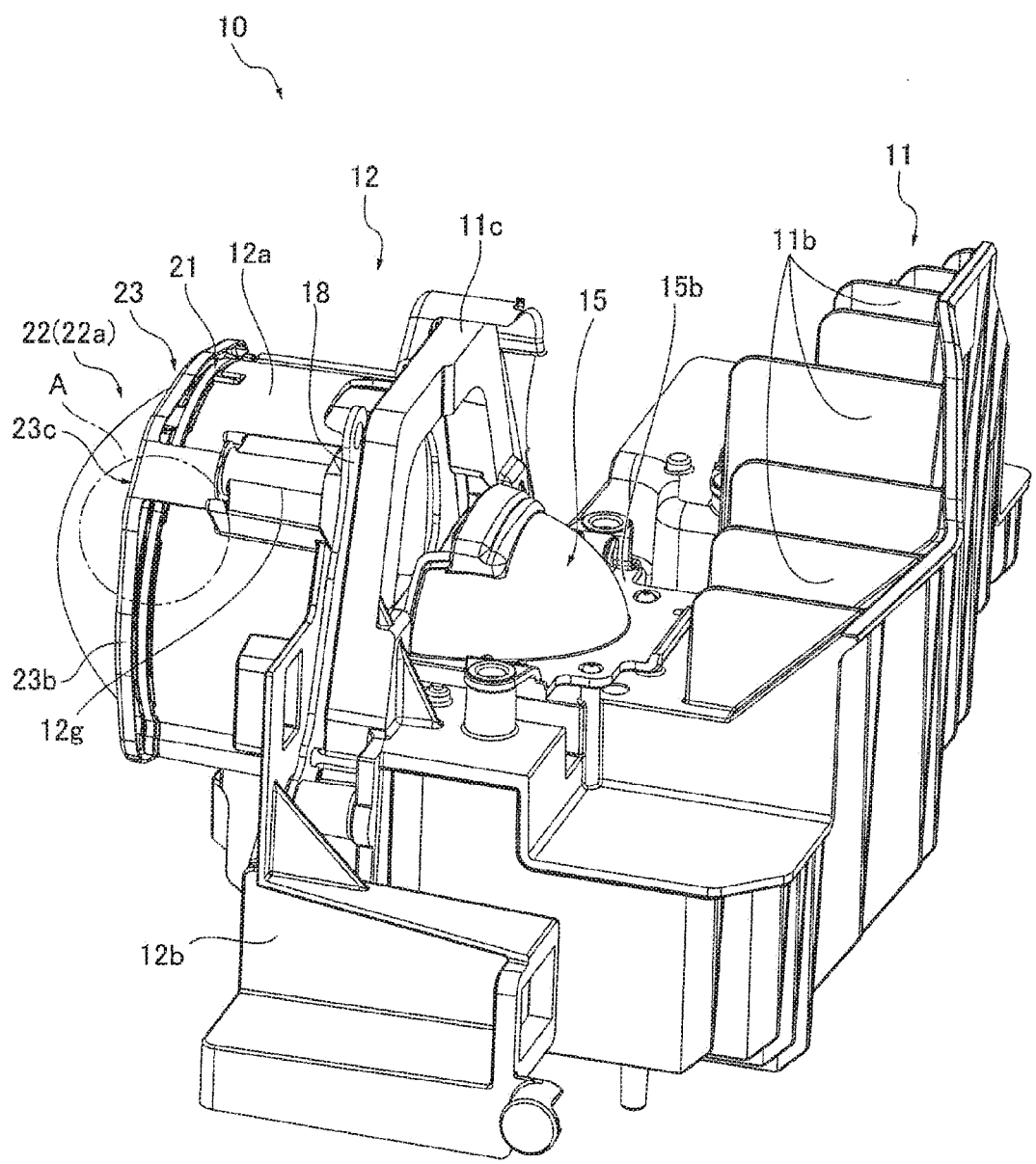
FIG. 2 is a perspective view showing an appearance in a case where the lighting device for vehicle 10 is seen from an oblique top.

The lighting device for vehicle 10 of the first embodiment as one example of the lighting device for vehicle, according to the present invention shown in the first embodiment, is employed as a headlamp for vehicle such as motor vehicle, and is intended to form a passing light distribution (a low beam) which is capable of preventing dazzling on an opposite lane. In the following description, it is presupposed to employ the longitudinal direction, transverse direction, and vertical direction that are seen from a driver in a vehicle to which the lighting device is to be mounted. The lighting device for vehicle 10, as shown in FIG. 1 to FIG. 3, is configured so that a lens holder 12 is mounted to a heat sink member 11 and the constituent elements (such as a semiconductor light emitting section 13), which will be described later, are provided thereat.

The heat sink member 11 is intended to radiate a heat generated at the semiconductor light emitting section 13 which will be described later; is formed of a material of thermal conductivity is high, such as a resin or a metal die cast; and in the first embodiment, is formed of an aluminum die cast of the metallic die casts. At the heat sink member 11, a light emitting section setup part 11a (refer to FIG. 3 or the like) for providing the semiconductor light emitting section 13, which will be described later, is provided, and a plurality of heat radiation fins 11b for radiating a heat generated thereat is provided. The light emitting section setup part 11a forms a flat surface including the longitudinal direction and the transverse direction, and via a light emission board 14 which will be described later, the semiconductor light emitting section 13 is provided (refer to FIG. 4 or the like). Each heat radiation fin 11b forms a plate shape along the longitudinal direction and the vertical direction at a rear side of the light emitting section setup part 11a, and is provided to be arranged in the transverse direction.

Figure 3:
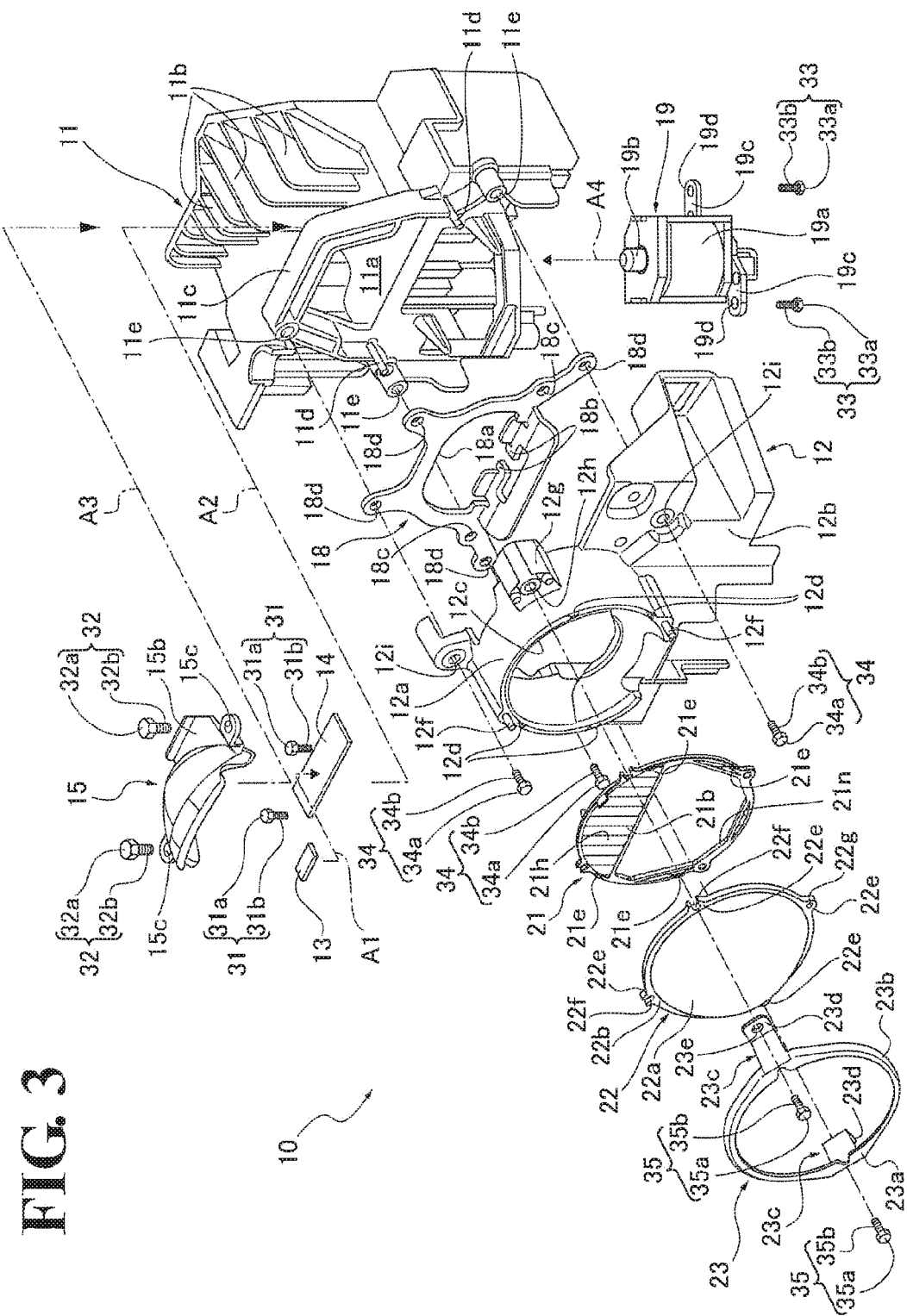
FIG. 3 is a schematic perspective view showing constituent elements of the lighting device for vehicle 10 in an exploded manner.

In the heat sink member 11, as shown in FIG. 3, at an end part of a front side, a supporting frame section 11c, two guiding protrusions 11d, and three coupling screw holes 11e are provided. At the supporting frame section 11c, a stopper member 18 which will be described later is applied to thereby prevent deformation of the stopper member 18. The two guiding protrusions 11d each form a columnar shape which protrudes forward from an end surface of the front side at the stopper member 18, and are capable of passing through a guiding hole 18c of the stopper member 18 and a guiding hole (not shown) of the lens holder 12 which will be described later. The three coupling screw holes 11e are holes extending in the longitudinal direction in an inner diameter dimension which is capable of accepting a shaft part 34b of a coupling screw member 34 which will be described later, and a screw groove is formed in an inner circumferential wall surface.

In addition, in the heat sink member 11, at a lower end thereof, two mounting screw holes 11g (refer to FIG. 4) are provided. The two mounting screw holes 11g are holes extending in the vertical direction in an inner diameter dimension which is capable of accepting a shaft part 33b of a fixing screw member 33 which will be described later, and a screw groove is formed in an inner circumferential wall surface (refer to FIG. 4). To the heat sink member 11, the lens holder 12 is mounted.

The lens holder 12 is intended to retain a projection lens 22 which will be described later and then mount the projection lens to the heat sink member 11 while a shade 17 (refer to FIG. 4) which will be described later is supported to be movable between the lens holder and the heat sink member 11. The lens holder 12 has a cylindrical part 12a which forms a cylindrical shape as a whole; and a mounting section 12b which extends downward therefrom (refer to FIG. 3). The lens holder 12 forms a lamp room which functions as an optical path in which the light that has been emitted, mainly by the cylindrical part 12a, from a light emission board 14 as described later, and that has been partially shaded by a shade 17, reaches the projection lens 22. The lens holder 12, in the first embodiment, is formed of an aluminum die cast of the metallic die casts in order to ensure the accuracy of mounting and the strength of supporting of the shade 17 and the projection lens 22.

In the lens holder 12, a plurality of second protrusion parts 12d are provided on a front side end surface 12c of the cylindrical part 12a. The second protrusion parts 12d each are partially protruded to a front side in the longitudinal direction from the front side end surface 12c of the cylindrical part 12a, and at the front side in the longitudinal direction, a posture determination surface 12e (refer to FIG. 6 and FIG. 7) is determined. The posture determination surface 12e is obtained as a flat surface which is orthogonal to the longitudinal direction (including the transverse direction and the vertical direction), and is also formed as a flat surface which is orthogonal to an axial centerline of the cylindrical part 12a. In addition, each of the second protrusion parts 12d is formed so that the respective posture determination surface 12e is positioned on a same plane which is orthogonal to the longitudinal direction. Each of the posture determination surfaces 12e is abutted against the light source side surface 21c of the plate member 21 (the annular section 21a) which will be described later to thereby determine the position and the posture of the plate member 21. The second protrusion part 12d, in the first embodiment, is provided at four sections while being established in a positional relationship which is symmetrical when it is seen in the transverse direction and the vertical direction.

Also, in the lens holder 12, two guiding protrusions 22f are provided on the front side end surface 12c of the cylindrical part 12a. Both of the guiding protrusions 12f each form a columnar shape which protrudes forward from the front side end surface 12c of the cylindrical part 12a, and are capable of passing through a guiding groove 21q or a guiding hole 21r of the plate member 21, which will be described later, and a guiding groove 22f and a guiding hole 22g of the projection lens 22, which will be described later. In addition, in the lens holder 12, two lens fixing sections 12g are provided on an outer circumferential surface of the cylindrical part 12a (refer to FIG. 1 or the like). The lens fixing section 12g is provided to be protruded from the outer circumferential surface of the cylindrical part 12a to the outside in a radial direction, and a fixing screw hole 12h is provided in the respective lens fixing section. The fixing screw holes 12h are holes extending in the longitudinal direction in an inner diameter dimension which is capable of accepting a shaft part 35b of a fixing screw member 35 which will be described later, and a screw groove is formed on an inner circumferential wall surface. These two lens fixing sections 12g are established in a positional relationship which is rotationally symmetrical with respect to a axial centerline of the cylindrical part 12a when it is seen from the front side in the longitudinal direction (the axial line of the projection lens 22 which will be described later (refer to FIG. 1)).

Further, in the lens holder 12, three mounting holes 12i are provided (in FIG. 3, only two holes are shown). The three mounting holes 12i are holes extending in the longitudinal direction determining an inner diameter dimension which is capable of accepting a shaft part 34b of a coupling screw member 34 which will be described later. In the lens holder 12, one of the three mounting holes 12i is provided in the cylindrical part 12a, and the other two are provided in the mounting section 12b (refer to FIG. 1 or the like). At the mounting section 12b, a plate-shaped piece extending downward of the cylindrical part 12a is formed to be appropriately bent. The coupling screw member 34 is employed to mount the lens holder 12 to the heat sink member 11.

The coupling screw member 34 has a head part 34a and a shaft part 34h. The head part 34a forms a columnar shape, and is determined in an outer diameter dimension which is not capable of passing inward of each mounting hole 12i which has been provided in the lens holder 12. The shaft part 34b forms a columnar shape in which a screw groove has been provided on an outer circumferential surface, and is determined in an outer diameter dimension which can be passed through the mounting hole 12i of the lens holder 12 and the coupling screw hole 11e that has been provided in the heat sink member 11. The coupling screw member 34 can be securely tightened and fixed into the coupling screw hole 11e by engaging the shaft part 34b with the coupling screw holes 11e of the heat sink member 11. Thus, the lens holder 12 can be mounted to the heat sink member 11 by means of the coupling screw member 34. In the heat sink member 11, the semiconductor light emitting section 13, the light emission board 14, and a reflector 15 are provided.

The semiconductor light emitting section 13 forms a light source in the lighting device for vehicle 10, and is obtained as a self-emission semiconductor light emitting section such as an LED or an organic EL (OLED). In the semiconductor light emitting section 13, in the first embodiment, an LED is employed. The semiconductor light emitting section 13 is provided to be implemented on the light emission board 14. The light emission board 14 is set up at the light emitting section setup part 11a by a power supplying member at which a connector or the like for supplying power has been provided, although not shown. The light emission board 14, in the first embodiment, is composed of a material of which thermal conductivity is good, and a metal base board is employed.

For the sake of setting the light emission board 14 at the light emitting section setup part 11a, a setup screw member 31 is employed. The setup screw member 31 has a head part 31a and a shaft part 31b. The head part 31a forms a columnar shape, and is determined in an outer diameter dimension which is not capable of passing inward of a setup hole, although not shown, which has been provided in the light emission board 14. The shaft part 31b forms a columnar shape in which a screw groove has been provided on an outer circumferential surface, and is determined in an outer diameter dimension which can be passed through the setup hole (not shown) of the light emission board 14 and a setup screw hole, although not shown, which has been provided in the light emitting section setup part 11a of the heat sink member 11. The setup screw member 31 can be securely tightened and fixed into the setup screw hole by engaging the shaft part 31b with the setup screw hole of the light emitting section setup part 11a of the heat sink member 11, although not shown. The light emission board 14 is fixed and set up by the setup screw member 31 at the light emitting section setup part 11a of the heat sink member 11 in a state in which the semiconductor light emitting section 13 has been implemented. In addition, in the light emission board 14, a connector, although not shown, is connected, and the implemented semiconductor light emitting section 13 is appropriately powered on and off, and functions as a light source. The reflector 15 is provided so as to cover the semiconductor light emitting section 13.

Figure 4:
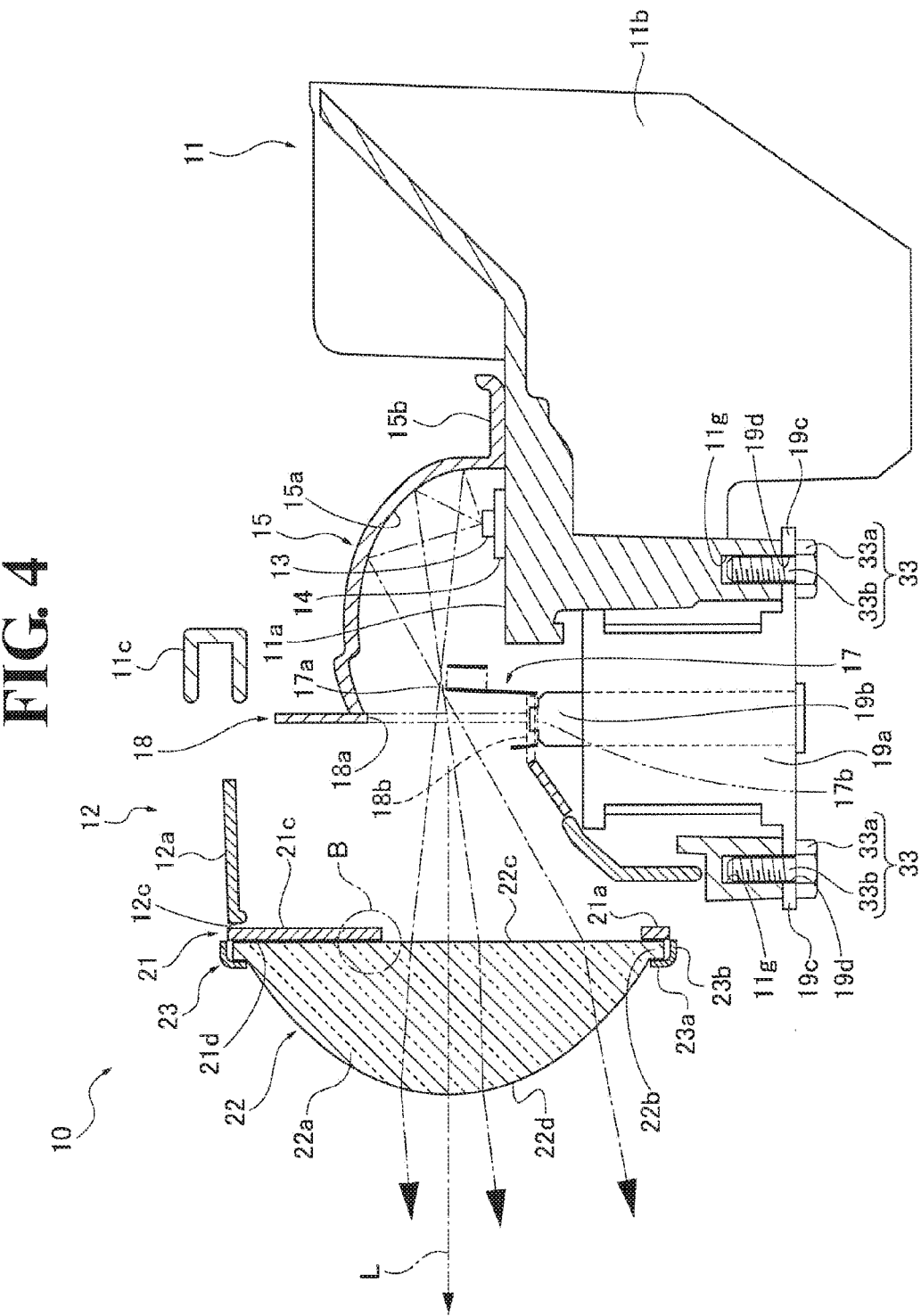
FIG. 4 is an explanatory view shown in a cross section taken along the line I-I of FIG. 1 in order to explain a configuration of the lighting device for vehicle 10.

The reflector 15 forms a dome-like shape which is capable of cover, from an upper side, the semiconductor light emitting section 13 that has been set up at the light emitting section setup part 11a, and as shown in FIG. 4, has a reflection surface 15a which has been inwardly obtained as a free curved surface on the basis of an ellipse. The reflection surface 15a is formed on the basis of the ellipse when the reflection surface is seen in a cross section which is viewed in the vertical direction, that is when the reflection surface is seen in a longitudinal cross section, and has a first focal point and a second focal point. At this reflector 15, a mounting piece section 15b forming a plate shape is provided (refer to FIG. 3). In the mounting piece section 15b, two mounting holes 15c penetrating in the vertical direction is provided, and is determined in an inner diameter dimension which is not capable of accepting the head part 32a of the fixing screw member 32 while making it possible to accept the shaft part 32b of the fixing screw member 32, respectively.

The fixing screw member 32 has a head part 32a and a shaft part 32b. The head part 32a forms a columnar shape, and is determined in an outer diameter dimension which is not capable of passing inward of the mounting hole 15c that has been provided in the reflector 15. The shaft part 32b forms a columnar shape in which a screw groove has been provided on an outer circumferential surface, and is determined in an outer diameter dimension which can be passed through the mounting hole 15c of the reflector 15 and a fixing screw hole (not shown) which has been provided in the vicinity of the light emitting section setup part 11a of the heat sink member 11. The fixing screw member 32 can be securely tightened and fixed into the fixing screw hole by engaging the shaft part 32b with the fixing screw hole of the heat sink member 11.

If the reflector 15 is mounted to the heat sink member 11 by means of both of the fixing screw members 32 that have been securely tightened and fixed into the respective fixing screw holes (not shown), the semiconductor light emitting section 13 that has been set up at the light emitting section setup part 11a is positioned in the vicinity of the first focal point of the reflection surface 15a. Thus, the light that has been emitted from the semiconductor light emitting section 13 is optically focused in the vicinity of the second focal point of the reflector 15. In the vicinity of the second focal point of the reflector 15, an upper end edge 17a of a shade 17 is positioned.

The shade 17 is composed of a member to inhibit transmission of light; forms a plate shape extending upward from a bottom surface inward of a lamp room formed by the lens holder 12; and has a predetermined width in the transverse direction (in a widthwise direction of a vehicle). Thus, the upper end edge 17a of the shade 17 extends in the widthwise direction of the vehicle, and stepped section (not shown) is provided at a center of the upper end edge 17a. The shade 17 is disposed on an optical path from a reflection surface 15a of the reflector 15 up to the projection lens 22 so as to prevent emission from the projection lens 22 of the luminous flux that is positioned at a substantially upper halved part when it is seen in a cross section which is orthogonal to an emission light axis L, of the luminous fluxes that are emitted from the semiconductor light emitting section 13 and which can be emitted from the projection lens 22 which will be described later. In the shade 17, in the vicinity of the upper end edge 17a thereof, the second focal point of the reflection surface 15a is positioned, and at an upper end of the luminous flux that is emitted from the projection lens 22, a boundary (referred to as a cutoff line) of brightness and darkness which faithfully follows the shape of the upper end edge 17a can be formed. In this manner, from the projection lens 22, the cutoff line on which the shape of the upper end edge 17a has been clearly reflected is formed, making it possible to emit the luminous flux that forms a light distribution pattern as a passing light distribution (a low beam) to illuminate a front side while preventing dazzling on an opposite lane.

In the shade 17, a position in the vertical direction is determined by the stopper member 18, enabling downward displacement by a shade driving mechanism 19. In the stopper member 18, as shown in FIG. 3, an optical path opening 18a is provided at a center of a plate-shaped member, and downward thereof, stopper piece sections 18b which form a pair in the transverse direction are provided. The optical path opening 18a communicates between: the reflector 15 at the front side of the reflector 15 that has been mounted to the heat sink member 11 so as to cover the semiconductor light emitting section 13; and the light emitting section setup part 11a (refer to FIG. 4). The pair of stopper piece sections 18b are provided downward of the optical path opening 18a, making it possible to bring into contact with a restraining piece section 17b (refer to FIG. 4) of the shade 17 from an upper side. In the shade 17, a pressing force to be moved towards an upper side by a spring section is applied between the lens holder 12 and the heat sink member 11, although not shown, and the restraining piece section 17b is pressed against the stopper piece section 18b, and the position in the vertical direction is thereby determined. In addition, in the shade 17, if the position in the vertical direction is determined by the stopper member 18 (a stopper piece section 18b), the upper end edge 17a is positioned in the vicinity of the second focal point of the reflector 15 (the reflection surface 15a).

In the stopper member 18, two guiding holes 18c and four mounting holes 18d are provided. The two guiding holes 18c are provided to penetrate the stopper member 18 at positions which correspond to those of two guiding protrusions 11d which has been provided at the heat sink member 11, and through the respective holes, the guiding protrusion 11d is passed to thereby prevent an occurrence of a relative displacement in a direction which is orthogonal to the longitudinal direction. The four mounting holes 18d are determined in an inner diameter dimension which is capable of accepting the shaft part 34b of the coupling screw member 34, which will be described later, and are provided to penetrate the stopper member 18. Three of the four mounting holes 18d are provided to be associated with the three coupling screw holes 11e that have been provided in the heat sink member 11, and the remaining one is intended to be associated with a coupling screw hole 11e at an upper side which has been provided in the heat sink member 11 when the left and right has been inverted.

The shade driving mechanism 19 is configured so that a movable shaft part 19b which is made movable in the vertical direction is provided at a main body section 19a in which a solenoid has been incorporated. In this shade driving mechanism 19, an upper end part of the movable shaft part 19b is protruded upward, and if power is supplied to the solenoid that has been incorporated in the main body section 19a, the movable shaft part 19b is moved downward. In the shade driving mechanism 19, a force of movement to move the movable shaft part 19b downward is set to be larger than a pressing force which has been applied to the shade 17 to move towards an upper side.

In the shade driving mechanism 19, two surrounding piece sections 19c are provided outward of the main body section 19a. Each of the surrounding piece sections 19c is formed in a flat plate shape along a surface which is orthogonal to the vertical direction and fixing holes 19d penetrating in the vertical direction are provided. Each of the fixing holes 19d is capable of accepting the shaft part 33b of the fixing screw member 33, which will be described later, and is determined in an inner diameter dimension which can be accept the head part 33a of the fixing screw member 33. The fixing holes 19d of the surrounding piece section 19c are provided to be associated with the mounting screw holes 11g (refer to FIG. 4) that has been provided at a lower end of the heat sink member 11. For the sake of mounting the shade driving mechanism 19 to the heat sink member 11, the fixing screw member 33 is employed.

The fixing screw member 33 has a head part 33a and a shaft part 33b. The head part 33a forms a columnar shape, and is determined in an outer diameter dimension which is not capable of passing inward of the fixing holes 19d of the respective surrounding piece sections 19c that have been provided in the shade driving mechanism 19. The shaft part 33b forms a columnar shape in which a screw groove has been provided on an outer circumferential surface, and is determined in an outer diameter dimension which can be passed through the fixing holes 19d of the shade driving mechanism 19 and the mounting screw holes 11g (refer to FIG. 4) that have been provided in the heat sink member 11. The fixing screw member 33 can be securely tightened and fixed into the mounting screw holes 11g by engaging the shaft part 33b with the mounting screw holes 11g of the heat sink member 11. In the shade driving mechanism 19, at an upper end part of the movable shaft part 19b, the shade 17 is mounted (refer to FIG. 4), and in that state, is fixed and mounted to the heat sink member 11 by means of the fixing screw member 33.

Thus, the shade 17 is pressed against the stopper member 18 by the pressing force that has been basically applied towards an upper side and then the position in the vertical direction is determined, and the upper end edge 17a is thereby positioned in the vicinity of the second focal point of the reflector 15 (refer to FIG. 4). In addition, in the shade 17, power is supplied to the shade driving mechanism 19 (the main body section 19a) and then the movable shaft part 19b is moved downward, and the upper end edge 17a is thereby moved downward from the vicinity of the second focal point of the reflector 15. Afterwards, the shade 17 is moved downward from a position to partially shade the luminous flux that has been emitted from the semiconductor light emitting section 13. In this manner, from the projection lens 22, it is possible to emit the luminous flux that forms a light distribution pattern as an ordinary light distribution (a high beam) in which a cutoff line is not formed by the shade 17. The projection lens 22 is mounted to the lens holder 12 via the plate member 21 by means of a fixing frame 23.

Figure 5:
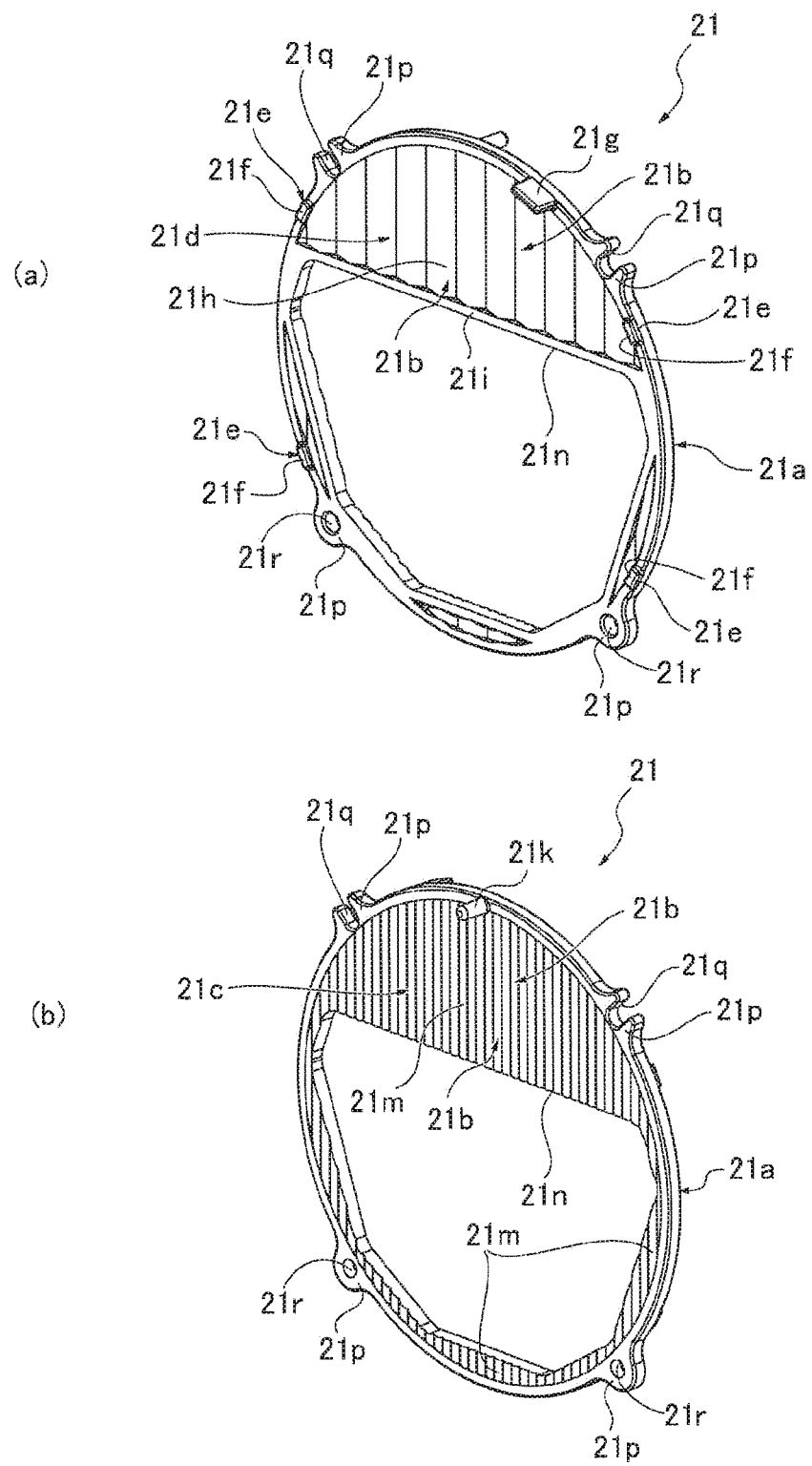
FIG. 5 is an explanatory view for explaining a configuration of a plate member 21, wherein FIG. 5 (a) is a perspective view showing an appearance in a case where the plate member is seen from a lens opposing surface 21d side, and FIG. 5 (b) is a perspective view showing an appearance in a case where the plate member is seen from a light source side surface 21c side.

The plate members 21 is provided so as to restrain (heat-insulate) a heat of the lens holder 12 from being transmitted to the projection lens 22. The plate member 21 is formed of a material of which thermal conductivity is lower than that of the lens holder 12, and more preferably, is formed of a member having a heat resistance which is higher than that of the projection lens 22 (having a high heat resistance temperature). The plate member 21, in the first embodiment, is formed of polycarbonate (PC). The plate member 21 forms an annular shape which corresponds to the front side end surface 12c of the cylindrical part 12a of the lens holder 12 as a whole. The plate member 21, as shown in FIG. 5 or the like, in the first embodiment, is configured so that a shading part 21b is provided at an annular section 21a. The annular section 21a forms an annular shape which corresponds to the cylindrical part 12a (the front side end surface 12c), and in the first embodiment, is determined in a shape and a dimensional size which is capable of applying the light source side surface 21c that is a rear side surface all over the front side end surface 12c (refer to FIG. 3 or the like). Also, the annular section 21a is determined in a shape and a dimensional size which is capable of applying the lens opposing surface 21d that is a front side surface all over the back face 22c of the flange section 22b of the projection lens 22 which will be described later (refer to FIG. 4 or the like). The shading part 21b forms a plate shape extending inward from the annular section 21a, and is provided to shade a part of an opening inside of the annular section 21a. The shading part 21b prevents the light (the luminous flux) that has been emitted from the semiconductor light emitting section 13 from directly illuminating an upper part on a surface which is orthogonal to the emission light axis L. Thus, in the plate member 21, inward of the annular section 21a, an opening part 21n is formed at a lower side of the shading part 21b.

In the plate member 21, as shown in FIG. 5 (a), a plurality of first protrusion parts 21e, a guiding protrusion 21g, and a lens-side diffusion surface 21h are provided on the lens opposing surface 21d. Each of the first protrusion parts 21e is formed to partially protrude to the front side in the longitudinal direction from the lens opposing surface 21d in the annular section 21a, and at the front side in the longitudinal direction, the posture determination surface 21f is determined. The posture determination surface 21f is obtained as a flat surface which is orthogonal to the longitudinal direction (including the transverse direction and the vertical direction). In addition, each of the first protrusion parts 21e is formed so that the respective posture determination surface 21f is positioned on a same plane which is orthogonal to the longitudinal direction. Each of the posture determination surfaces 21f is facially abutted against the back face 22c of the projection lens 22 (the flange section 22b) which will be described later to thereby determine the position and the posture of the projection lens 22. The first protrusion part 21e, in the first embodiment, is provided at four sections while being established in a positional relationship which is symmetrical when it is seen in the transverse direction and the vertical direction.

The guiding protrusion 21g forms a plate shape which protrudes forward from the lens opposing surface 21d at the annular section 21a, and can be applied from the outside in the radial direction to the flange section 22b of the projection lens 22 (the outer circumferential edge) which will be described later. The guiding protrusion 21g roughly determines the position of the plate member 21 in a direction along the surface that is orthogonal to the longitudinal direction, that is, the position of the projection lens 22 with respect to the lens holder 12 to which the plate member 21 is to be mounted, which will be described later.

The lens-side diffusion surface 21h, as described later, is intended to diffuse the light that has been emitted from the semiconductor light emitting section 13 and that has been guided to the lens opposing surface 21d in the plate member 21, and in the first embodiment, is provided on the lens opposing surface 21d at the shading part 21b. The lens-side diffusion surface 21h is formed of unevenness which is arranged so as to have a predetermined regularity, the unevenness having a dimensional size which can be visually recognized through the projection lens 22 which will be described later. The lens-side diffusion surface 21h, in the first embodiment, is obtained as a so called longitudinally patterned roulette in which protrusive striped parts extending in the vertical direction have been formed to be arranged in the transverse direction, and when it is seen in a cross section which is orthogonal to the vertical direction, the respective protrusive striped parts are adapted to protrude in an arc shape towards a front side. Incidentally, in so far as the lens-side diffusion surface 21h is concerned, it is sufficient if the shape of the respective protrusive striped parts when it is seen in the cross section that is orthogonal to the vertical direction is appropriately set, without being limitative to the configuration of the first embodiment. Also, in so far as the lens-side diffusion surface 21h is concerned, it is sufficient if the direction in which the roulette (each protrusive striped part) extends be appropriately set, without being limitative to the configuration of the first embodiment.

The lens-side diffusion surface 21h is provided up to the vicinity of a lower end at the shading part 21b. That is, each projective striped part is intended to extend up to the vicinity of the lower end at the shading part 21b. Thus, in the first embodiment, at the lower end of the shading part 21b in the lens opposing surface 21d, the lens-side diffusion surface 21h does not exist, and a lower end flat surface 21i which has been obtained as a flat surface is provided. The lower end flat surface 21i forms a linear pattern which extends in the transverse direction downward of the lens-side diffusion surface 21h without degrading an action of diffusing the light that has been emitted from the semiconductor light emitting section 13 by the lens-side diffusion surface 21h in order to prevent dazzling due to unexpected light which will be described later.

In the plate member 21, as shown in FIG. 5 (b), the light source side surface 21c at the annular section 21a is obtained as a flat surface which is parallel to a plane which is determined by the posture determination surface 21f (refer to FIG. 5 (a)) of each first protrusion part 21e. Thus, the plate member 21 applies the light source side surface 21c of the annular section 21a to the posture determination surface 12e (refer to FIG. 3) of each second protrusion part 21d which has been provided on the front side end surface 12c of the cylindrical part 12a of the lens holder 12 to thereby enable the plane that is determined by each posture determination surface 21f to be orthogonal to the longitudinal direction.

In the plate member 21, a positioning columnar section 21k and a light source side diffusion surface 21m are provided on the light source side surface 21c. The positioning columnar section 21k forms a columnar shape which protrudes rearward from the light source side surface 21c at the annular section 21a, enabling engagement into a positioning hole (not shown) which has been provided in the front side end surface 12c of the cylindrical part 12a of the lens holder 12. The positioning columnar section 21k prevents displacement of the plate member 21 with respect to the lens holder 12 (the cylindrical part 12a) in the direction along the surface that is orthogonal to the longitudinal direction.

The light source side diffusion surface 21m is intended to diffuse the light that has been emitted from the semiconductor light emitting section 13 and that has been guided to the light source side surface 21c at the plate member 21. The light source side diffusion surface 21m, in the first embodiment, is provided on the light source side surface 21c of the plate member 21, that is, all over the light source side surface 21c at the annular section 21a and the shading part 21b. The light source side diffusion surface 21m, in the first embodiment, is obtained as a so called longitudinally patterned roulette in which the protrusive striped parts extending in the vertical direction have been formed to be arranged in the transverse direction, and each protrusive striped part is adapted to protrude in an arc shape towards a front side when it is seen in a cross section which is orthogonal to the vertical direction. That is, the light source side diffusion surface 21m is obtained as a longitudinally patterned roulette, like the lens-side diffusion surface 21h (refer to FIG. 5 (a)). In addition, on the light source side diffusion surface 21m, each protrusive striped part is provided in finer pitches that those of the lens-side diffusion surface 21h, the quantity of protrusion in each protrusive striped part is made small, and the curvature is made large. Incidentally, in so far as the light source side diffusion surface 21m is concerned, it is sufficient if the shape of each protrusive striped part when it is seen in a cross section which is orthogonal to the vertical direction is appropriately set, without being limitative to the configuration of the first embodiment. In addition, in so far as the light source side diffusion surface 21m is concerned, it is sufficient if the direction in which the roulette (each protrusive striped part) extends is appropriately set, and is no limited to that of the first embodiment.

Further, in the plate member 21, four guiding pieces 21p are provided on an outer circumferential surface of the annular section 21a. Each of the guiding pieces 21p forms a plate shape which has been protruded to the outside in the radial direction from the outer circumferential surface of the annular section 21a. In the guiding piece 21p, guiding grooves 21q are provided at two sections which are positioned at an upper part of the annular section 21a, and guiding holes 21r are provided at two sections which are positioned at a lower part of the annular section 21a. Each guiding groove 21q and each guiding hole 21r are established in inner diameter dimensions which can be accepting the guiding protrusions 12f (refer to FIG. 3) that have been provided at the cylindrical part 12a of the lens holder 12 (the front side end face 12c). The four guiding pieces 21p, in the first embodiment, is established in a positional relationship which is rotationally symmetrical with respect to the axial centerline of the cylindrical part 12a (the axial line of the projection lens 22 which will be described later (refer to FIG. 1)).

The projection lens 22, as shown in FIG. 3 or the like, is intended to forward radiate, as a predetermined light distribution pattern, the luminous flux that has been emitted from the semiconductor light emitting section 13 and that has been reflected by the reflection surface 15a of the reflector 15, and in the first embodiment, is composed of a flat convex lens. The projection lens 22 is formed by employing a resin material in order to promote reduction of its own weight, and in turn, the weight of the lighting device for vehicle 10, since the light that is emitted from the semiconductor light emitting section 13 hardly has a heat. As the resin material that is employed for the projection lens 22, polycarbonate (PC), it is possible to employ a methacryl resin (PMMA), a cyclic olefin copolymer (PCO) or the like, and in the first embodiment, an acrylic resin is employed. The projection lens 22 has a lens section 22a which has been obtained as a flat convex lens on the basis of a non-spherical surface; and a flange section 22b which has been provided at the periphery thereof.

In so far as the lens section 22a is concerned, the light from the semiconductor light emitting section 13 is made incident from the back face 22c that is positioned at the rear side in the longitudinal direction, and the light having travelled inward is emitted from the surface 22d that is positioned at the front side in the longitudinal direction (refer to FIG. 4). That is, in the projection lens 22, the back face 22c is obtained as a flat face, and the surface 22d is obtained as a convex face. In addition, the back face 22c in the flange section 22b is obtained as a flat face which is orthogonal to an axial centerline (a lens optical axis) of the lens section 22a. From this fact, the projection lens 22 applies the back face 22c of the flange section 22b to the posture determination surface 21f (refer to FIG. 5 (a)) of each first protrusion part 21e of the plate member 21 to thereby establish the posture in which the axial centerline the lens optical axis) of the lens section 22a is orthogonal to the plane that is determined by each of the posture determination surfaces 21f.

In the flange section 22b, four guiding pieces 22e are provided on an outer circumferential surface. Each of the guiding pieces 22e forms a plate shape which has been protruded to the outside in the radial direction from the outer circumferential surface of the flange section 22b. In the guiding piece 22e, guiding grooves 22f are provided at two sections which are positioned at an upper part of the flange section 22b, and guiding holes 22g (only one is shown in FIG. 3) are provided at two sections which are positioned at a lower part of the flange section 22b. Each of the guiding grooves 22f and each of the guiding holes 22g are established in inner diameter dimensions which are capable of accepting the guiding protrusions 12f (refer to FIG. 3) that has been provided at the cylindrical part 12a of the lens holder 12 (the front side end face 12c). The four guiding pieces 22e, in the first embodiment, are established in a positional relationship which is rotationally symmetrical with respect to the axial centerline of the cylindrical part 12a when it is seen from the front side in the longitudinal direction (the axial line of the projection lens 22 which will be described later (refer to FIG. 1)), and is established in a positional relationship which corresponds to each guiding piece 21p which has been provided at the plate member 21. For the sake of mounting of the projection lens 22, a fixing frame 23 is employed.

The fixing frame 23 is employed to fix the projection lens 22 to the lens holder 12 (the cylindrical part 12a) via the plate member 21, and as shown in FIG. 3, is formed in a circular ring shape which corresponds to the flange section 22b of the projection lens 22. The fixing frame 23, as shown in FIG. 7 or the like, is composed of; a pressing piece section 23a in which the section having been formed in the circular ring shape as a whole are taken along the surface that is orthogonal to the longitudinal direction; and a surrounding piece section 23b of which outside in the radial direction has been folded to the rear side. The pressing piece section 23a forms a plat plate shape which exists along the surface that is orthogonal to the longitudinal direction, and is capable of being pressed from the front side to the surface 22d of the flange section 22b of the projection lens 22. The surrounding piece section 23b is capable of surrounding a target so as to be spaced from each other at intervals at the outside in the radial direction of the flange section 22b of the projection lens 22.

At the fixing frame 23, as shown in FIG. 3, a pair of mounting piece sections 23c are provided. Each of the mounting piece sections 23c forms a plate shape which has been formed to partially extend the surrounding piece section 23b towards the rear side, and a tip end part thereof is folded to the outside in the radial direction and then is obtained as a fixing piece section 23d.

Each of the fixing piece sections 23d is formed in a flat plate shape along the surface that is orthogonal to the longitudinal direction, and fixing holes 23e penetrating in the longitudinal direction are provided. Each of the fixing holes 23e is capable of accepting the shaft part 35b of the fixing screw member 35 which will be described later, and is established in an inner diameter dimension which is not capable of accepting the head part 35a of the fixing screw member 35. The fixing holes 23e of the surrounding piece section 23b (the fixing piece section 23d) are provided to be associated with the two fixing screw holes 12h that have been provided on the outer circumferential surface of the cylindrical part 12a of the lens holder 12. For the sake of mounting to the lens holder 12 of the fixing frame 23, the projection lens 22, and the plate member 21, the fixing screw member 35 is employed.

The fixing screw member 35 has a head part 35a and a shaft part 35b. The head part 35a forms a columnar shape, and is established in an outer diameter dimension which is not capable of passing inward of the fixing hole 23e of each mounting piece section 23c which has been provided in the fixing frame 23. The shaft part 35b forms a columnar shape in which a screw groove has been provided on the outer circumferential surface, and is established in an outer diameter dimension which is capable of passing through the fixing hole 23e of the fixing frame 23 and the respective fixing screw holes 12h which have been provided in the cylindrical part 12a of the lens holder 12. The fixing screw member 35 can be securely tightened and fixed into the fixing screw hole 12h by engaging the shaft part 35b with the fixing screw hole 12h of the lens holder 12.

Next, an example of a method of assembling the lighting device for vehicle 10 will be described. First, as shown in FIG. 3, the semiconductor light emitting section 13 is implemented on the light emission board 14 (refer to the arrow A1), and the light emission board 14 is set up to be fixed to the light emitting section setup part 11a of the heat sink member 11 by means of the setup screw member 31 (refer to the arrow A2). Afterwards, the shaft part 32b of the fixing screw member 32 is passed through each mounting hole 15c which has been provided in the mounting piece section 15b of the reflector 15, and the shaft part 32b (the fixing screw member 32) is securely tightened and fixed into the corresponding fixing screw hole (not shown) of the heat sink member 11 (refer to the arrow A3). In this manner, the reflector 15 is mounted to the heat sink member 11 (the light emitting section setup part 11a). Then, the reflector 15, in the vicinity of the first focal point of the reflection surface 15a, positions the semiconductor light emitting section 13 that has been set up at the light emitting section setup part 11a (refer to FIG. 4).

Afterwards, the shade 17 (refer to FIG. 4) is mounted to the movable shaft part 19b of the shade driving mechanism 19, and the shaft part 33b of the fixing screw member 33 is passed through the fixing hole 19d of each surrounding piece section 19c of the shade driving mechanism 19. The shaft part 33b (the fixing screw member 33) is then securely tightened and fixed into the mounting screw hole 11g (refer to FIG. 4) of the heat sink member 11, and the shade driving mechanism 19 and the shade 17 are thereby mounted to the heat sink member 11 (refer to the arrow A4).

The two guiding protrusions 11d of the heat sink member 11 are then passed through the corresponding guiding holes 18c of the stopper member 18, and the stopper member 18 is applied to the supporting frame section 11c of the heat sink member 11. At this time, a positional relationship is established such that the restraining piece section 17b of the shade 17 is pressed against the pair of stopper piece sections 18b of the stopper member 18 from a lower side. In this state, the shaft part 34b of the coupling screw member 34 is passed through the three mounting holes 12i of the lens holder 12 and the corresponding mounting holes 18d of the stopper member 18, and the shaft part 34b (the coupling screw member 34) is securely tightened and fixed into the three coupling screw holes 11e of the heat sink member 11. In this manner, the shade 17, the stopper member 18, and the shade driving mechanism 19 are interposed, and the lens holder 12 is mounted to the heat sink member 11. In this manner, in so far as the shade 17 is concerned, the upper end edge 17a is adapted to be positioned in the vicinity of the second focal point of the reflector 15 in cooperation with the stopper member 18, and from that state, can be moved downward by means of the shade driving mechanism 19.

Figure 6:
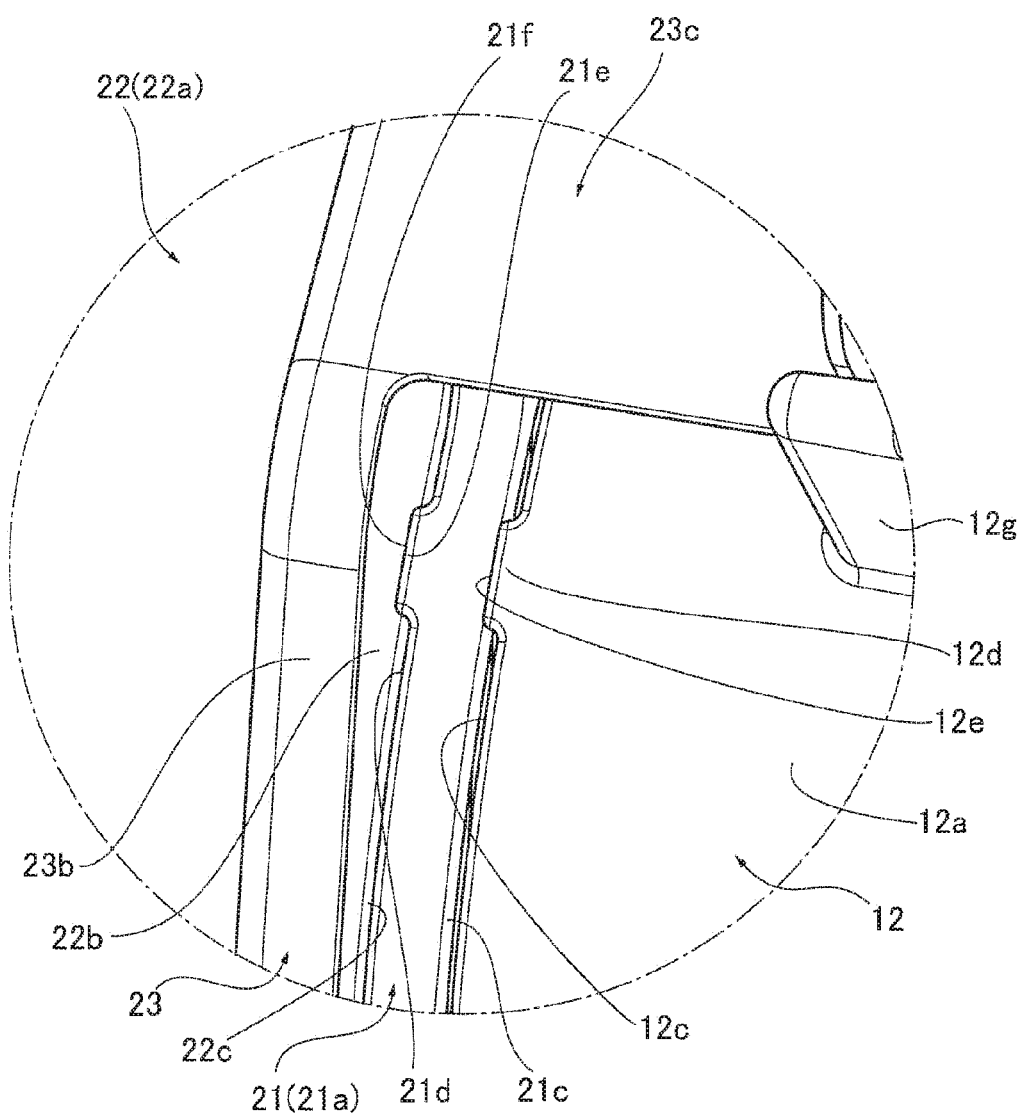
FIG. 6 is an explanatory view showing a section (a section A) indicated by a circle A in FIG. 2 in a partially enlarged manner.
Figure 7:
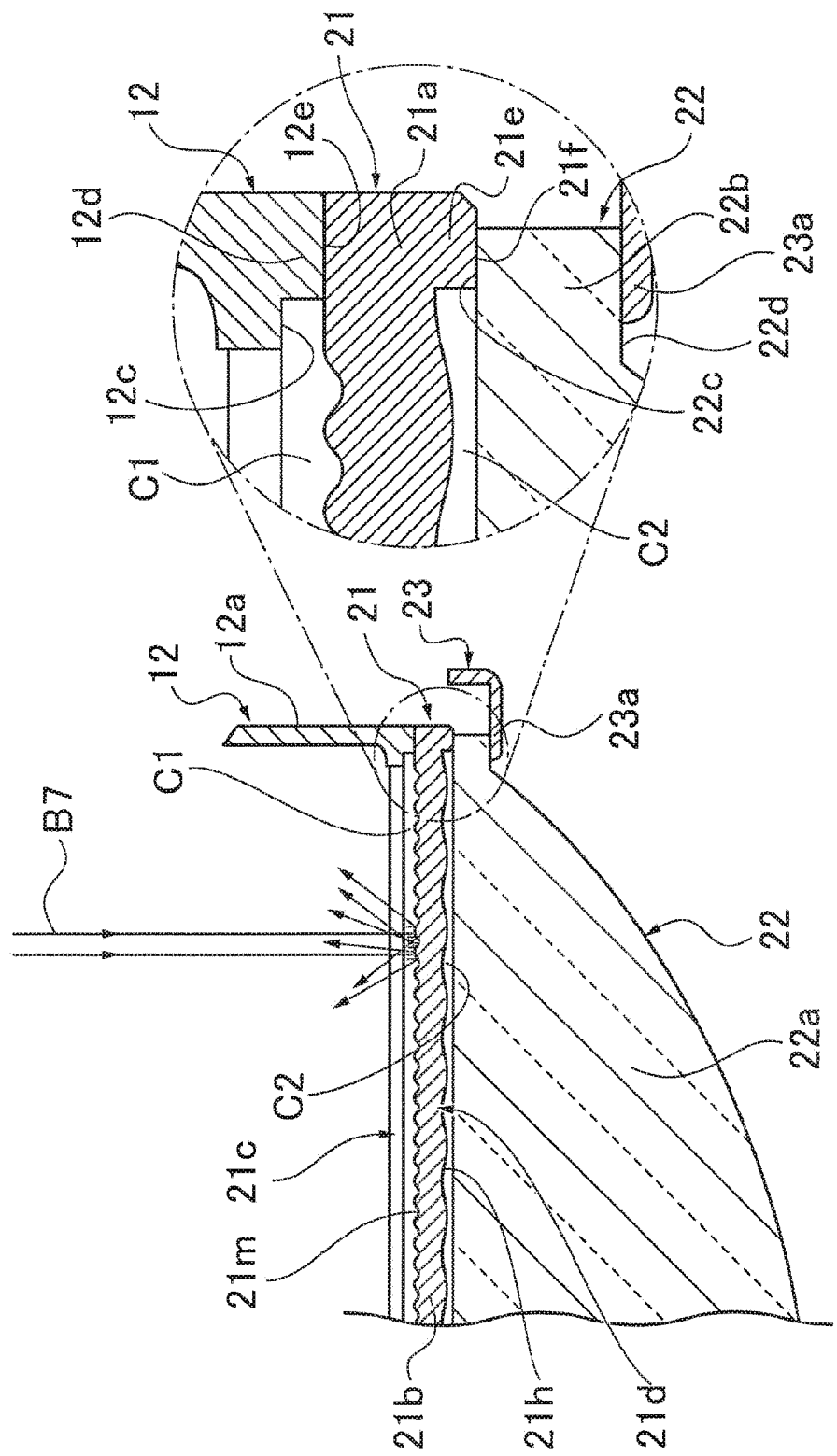
FIG. 7 is an explanatory view shown in a cross section taken along the line II-II of FIG. 1 in order to explain an appearance in a case where a projection lens 22 has been mounted to a lens holder 12 via the plate member 21.
Figure 8:
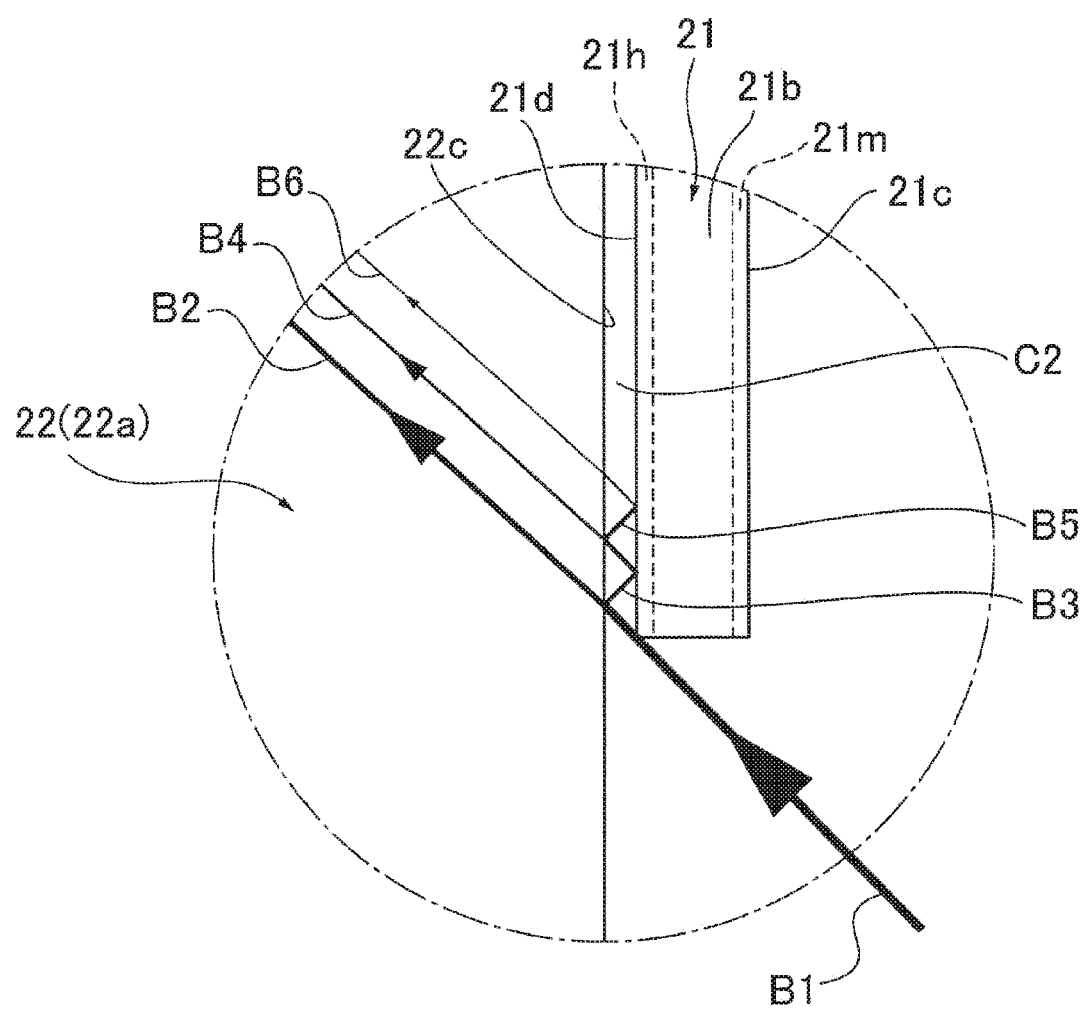
FIG. 8 is an explanatory view showing a section (a section B) indicated by a circle B in FIG. 4 in a partially enlarged manner.

Afterwards, while the two guiding protrusions 12f on the front side end surface 12c of the cylindrical part 12a of the lens holder 12 are passed through the corresponding guiding groove 21q or the guiding hole 21r of the four guiding pieces 21p of the plate member 21, the light source side surface 21c of the annular section 21a is applied to the front side end surface 12c of the cylindrical part 12a (refer to FIG. 6 and FIG. 7 or the like). Then, on the front side end surface 12c, a plurality of (in the first embodiment, four) second protrusion parts 12d are provided and thus the annular section 21a of the plate member 21 (the light source side surface 21c) is applied to the posture determination surface 12e of each protrusion part 12d (refer to FIG. 6 and FIG. 7). Each of the posture determination surfaces 12e is intended to be positioned on a same plane which is orthogonal to the longitudinal direction and thus the plate member 21 is provided at the cylindrical part 12a of the lens holder 12 while being orthogonal to the longitudinal direction. The plate member 21 (the light source side surface 21c) is applied to the second protrusion parts 12d (the posture determination surface 12e) and thus a gap C1 (refer to FIG. 7) in height dimensions (the quantity of protrusion in the longitudinal direction) of the second protrusion parts 12d is placed with respect to the cylindrical part 12a of the lens holder 12 (the front side end surface 12c).

Afterwards, while the two guiding protrusions 12f on the front side end surface 12c of the cylindrical part 12a of the lens holder 12 is passed through the corresponding guiding groove 22f or guiding hole 22g of the four guiding pieces 22e of the projection lens 22, the back face 22c of the flange section 22b is applied to the lens opposing surface 21d of the annular section 21a21a of the plate member 21 (refer to FIG. 6 and FIG. 7 or the like). Then, at the annular section 21a, a plurality of (in the first embodiment, four) first protrusion parts 21e are provided and thus the flange section 22b of the projection lens 22 (the back face 22c) is applied to the posture determination surface 21f of each first protrusion part 21 (refer to FIG. 6 and FIG. 7). Each of the posture determination surfaces 21f is intended to be positioned on a same plane which is orthogonal to the longitudinal direction and the back face 22c of the flange section 22b is obtained as a flat surface which is orthogonal to the axial centerline (the lens optical axis) of the lens section 22a and thus the axial centerline (the lens optical axis) is made parallel to the longitudinal direction, and the projection lens 22 is provided at the cylindrical part 12a of the lens holder 12. The projection lens 22 (the back face 22c) is applied to the first protrusion part 21e (the posture determination surface 21f) and thus a gap C2 (refer to FIG. 7) in height dimension (the quantity of protrusion in the longitudinal direction) of the first protrusion part 21e is placed with respect to the plate member 21 (the lens opposing surface 21d).

Afterwards, the fixing frame 23 is applied from the front side of the projection lens 22. In detail, while the flange section 22b of the projection lens 22 is positioned inward of the surrounding piece section 23b of the fixing frame 23, the pressing piece section 23a of the fixing frame 23 is applied to the surface 22d of the flange section 22b of the projection lens 22 (refer to FIG. 4 and FIG. 7). At this time, each fixing hole 23e of the fixing piece section 23d in the pair of mounting piece sections 23c of the fixing frame 23 is established in a positional relationship which corresponds to the two fixing screw holes 12h that have been provided on the outer circumferential surface of the cylindrical part 12a of the lens holder 12. In this state, the shaft part 35b of the two fixing screw members 35 is passed through the corresponding fixing hole 23e of the fixing frame 23, and the shaft part 35b (the fixing screw member 35) is securely tightened and fixed into the corresponding fixing screw hole 12h of the cylindrical part 12a of the lens holder 12. The fixing frame 23 is fixed to the lens holder 12, whereby the projection lens 22 is mounted to the lens holder 12 (the cylindrical part 12a) while the plate member 21 is interposed therebetween. At this time, in so far as the projection lens 22 is concerned, a rear side focal point is positioned in the vicinity of the second focal point of the reflector 15.

The thus assembled lighting device for vehicle 10 emits the luminous flux that has been emitted from the semiconductor light emitting section 13 and that has been reflected by the reflection surface 15a of the reflector 15 so as to be taken along the emission light axis L from the projection lens 22 when it is seen in a longitudinal cross section (the surface including the vertical direction and the longitudinal direction). At this time, in the lighting device for vehicle 10, although the plate member 21 is interposed between the projection lens 22 and the lens holder 12 (the cylindrical part 12a), the opening part 21n is provided in the plate member 21 and thus there is no apprehension that emission from the projection lens 22 mentioned above is inhibited by the plate member 21. The luminous flux that has been emitted from the projection lens 22 is partially shaded by the shade 17 in the lamp room that is formed by the lens holder 12 and then a light distribution pattern in which a cutoff line has been formed is obtained. Also, in so far as the lighting device for vehicle 10 is concerned, if the shade driving mechanism 19 (the main body section 19a) is driven to move the movable shaft part 19b downward, the shade 17 does not perform partial shading in the lamp room, and a luminous flux of a light distribution pattern is emitted as an ordinary light distribution in which no cutoff line is formed. Thus, in the lighting device for vehicle 10, forward of the projection lens 22, a light distribution pattern to radiate a substantially lower halved part can be formed without emitting a substantially upper halved part in the surface that is orthogonal to the emission light axis L and a light distribution pattern to radiate a part of the upper halved part together with the substantially lower halved part can also be formed. In other words, in the lighting device for vehicle 10, by mean of the light (the luminous flux) that has been emitted from the projection lens 22, a light distribution pattern as a passing light distribution pattern (a low beam) and a light distribution pattern as an ordinary light distribution pattern (a high beam) can be formed.

In the lighting device for vehicle 10, the semiconductor light emitting section 13 as a light source (the light emission board 14 on which it has been provided) is provided at the heat sink member 11 (the light emitting section setup part 11a). Thus, in the lighting device for vehicle 10, the heat that has been generated at the semiconductor light emitting section 13 (the light emission board 14) can be radiated by the heat sink member 11, mainly by the plurality of heat radiation fins 11b, making it possible to prevent an excessive rise of the temperature of the semiconductor light emitting section 13 and the light emission board 14.

Here, in the lighting device for vehicle 10, the light that is emitted from the semiconductor light emitting section 13 hardly has a heat and thus the projection lens 22 that has been formed of a resin material in place of a glass material is employed to achieve reduction of the weight. In the lighting device for vehicle 10, the projection lens 22 is held by the lens holder 12 and thus assuming that the plate member 21 is not provided, the heat is transmitted to the projection lens 22 (the part held by the lens holder 12) through the lens holder 12 that has been mounted to the heat sink member 11. In the projection lens 22 that has been formed of the resin material, the heat resistance temperature is low in comparison with that of the projection lens that has been formed of the glass material and thus there may be a case in which, if the heat that has been transmitted to the heat sink member 11 is transmitted through the lens holder 12, a deformation occurs. Thus, in the lighting device for vehicle 10, for example, if the part that has been held by the lens holder 12 of the projection lens 22 is deformed due to the heat that has been transmitted through the lens holder 12, there may be a case in which the accuracy of mounting of the projection lens 22 to the lens holder 12 lowers, and there may be a case in which a light distribution failure occurs. Here, in the projection lens that has been formed of the glass material, the heat resistance temperature is high and thus there is no problem even if the heat of the heat sink member 11 is transmitted through the lens holder 12.

On the other hand, in the lighting device for vehicle 10 of the first embodiment as the lighting device for vehicle according to the present invention, the plate member 21 that has been formed of a member of which thermal conductivity is lower than that of the lens holder 12 is provided between the projection lens 22 and the lens holder 12. Thus, in the lighting device for vehicle 10, after the heat sink member 11 has been heated by the heat that has been generated at the semiconductor light emitting section 13 (the light emission board 14), even if the heat has been transmitted to the lens holder 12, it is possible to significantly restrain the heat of the lens holder 12 from being transmitted to the projection lens 22. That is, in the projection lens 22, although the heat of the lens holder 12 is transmitted mainly due to thermal conduction, the plate member 21 is provided with respect to the lens holder 12 and thus the plate member 21 functions as a heat insulation member to thereby significantly restrain the heat from being transmitted due to the thermal conduction. In this manner, in the lighting device for vehicle 10, it is possible to prevent the projection lens 22 from being deformed due to the heat that has been transmitted through the lens holder 12. Therefore, in the lighting device for vehicle 10, it is possible to prevent lowering of the accuracy of mounting of the projection lens 22 to the lens holder 12 and it is possible to prevent an occurrence of a light distribution failure.

In addition, in the lighting device for vehicle 10, the shading part 21b is provided at the plate member 21. Thus, in the lighting device for vehicle 10, by means of the shading part 21b of the plate member 21, it is possible to prevent the light (the luminous flux) that has been emitted from the semiconductor light emitting section 13 from being directly incident to an upper part of the projection lens 22 (the direct light from being incident to the upper part of the projection lens 22). This is because, in the lighting device for vehicle 10, a part of the direct light that has been emitted from the semiconductor light emitting section 13 may travel in the direction in which the light is directly incident to the upper part of the projection lens 22. In addition, such direct light that is incident to the upper part of the projection lens 22 is unrequired in terms of light distribution, since the light directly radiates the upper part in the surface that is orthogonal to the emission light axis to thereby cause dazzling. Thus, in the lighting device for vehicle 10, even in a case where direct light which will be unrequired in terms of light distribution has been generated in the lamp room that is formed by the lens holder 12, the emission of the direct light from the upper part of the projection lens 22 can be reliably prevented by the shading part 21b of the plate member 21.

Further, in the lighting device for vehicle 10, the shading part 21b is provided at the plate member 21; and therefore, it is possible to prevent incidence to the upper part of the projection lens 22, of the light (the luminous flux) that is not controlled, the light having been emitted from the semiconductor light emitting section 13 and having been reflected on a part other than the reflection surface 15a in the lamp room that is formed by the lens holder 12. In this manner, in the lighting device for vehicle 10, radiation of unintended light (luminous flux) as a glare forward of the vehicle can be prevented by the shading part 21b of the plate member 21.

In the lighting device for vehicle 10, the lens-side diffusion surface 21h is provided on the lens opposing surface 21d at the shading part 21b of the plate member 21. Thus, in the lighting device for vehicle 10, it is possible to prevent the light (the luminous flux) from being emitted from the projection lens 22 to thereby cause dazzling, the light being unrequired in terms of light distribution due to provision of the shading part 21b at the plate member 21 that is disposed between the projection lens 22 and the lens holder 12. This is due to the fact described below. First, a lighting device for vehicle, employing the plate member 21 as a flat surface in which the lens-side diffusion surface 21h is not provided on the lens opposing surface 21d of the shading part 21b, is employed as a lighting device for vehicle (10A (the lighting device for vehicle 10 is employed in the drawing, since they are substantially equal to each other in terms of configuration)). In the lighting device for vehicle (10A), as is the case with the lighting device for vehicle 10, the light (luminous flux) B1 that has traveled to the projection lens 22 without being shaded by the shading part 21b of the plate member 21 is advanced from the back face 22c into the projection lens 22 and then is emitted from the projection lens 22 (refer to light B2 of FIG. 8). At this time, on the back face 22c of the projection lens 22, as shown in FIG. 8, a part of the light B1 is reflected, and light B3 that has been reflected in the vicinity of the shading part 21b travels into a gap C2 that has been formed between the projection lens 22 (the back face 22c) and the shading part 21b (the lens opposing surface 21d). Then, the light B3 travels to the lens opposing surface 21d of the shading part 21b, the light is reflected by the lens opposing surface 21d, and the reflected light travels to the back face 22c of the projection lens 22 again, and a part thereof (light B4) travels from the back face 22c into the projection lens 22, and another part (light B5) is reflected by the back face 22c. Thus, multiple reflections occur between the projection lens 22 (the back face 22c) and the shading part 21b (the lens opposing surface 21d). This circumstance becomes significant if the gap C2 is formed between the back face 22c and the lens opposing surface 21d. Thus, in the lighting device for vehicle (10A), the light (such as B4) that is reflected by the lens opposing surface 21d of the shading part 21b and then travels into the projection lens 22 travels into the projection lens 22 in a direction similar to that of the light (the luminous flux) that is essentially shaded by the shading part 21b. In this manner, in the lighting device for vehicle (10A), if multiple reflections occur between the back face 22a and the lens opposing surface 21d, there may be a case in which unexpected light, which should be shaded by the shading part 21b (hereinafter, referred to as unexpected light), is emitted from the projection lens 22. In some cases, there is an apprehension that the unexpected light becomes light deviating from the laws or regulations that are stipulated with respect to the lighting device for vehicle. On the other hand, in the lighting device for vehicle 10, the lens-side diffusion surface 21h is provided on the lens opposing surface 21d of the shading part 21b, so that the light B3 having travelled to the lens opposing surface 21d can be diffused by the lens-side diffusion surface 21h (the lens opposing surface 21d). Thus, in the lighting device for vehicle 10, even if the light B3 travels to the back face 22c of the projection lens 22 again, unlike the case in which the light is reflected by a flat lens opposing surface 21d as in the lighting device for vehicle (10A), it is possible to distort the direction in which the light travels to the back face 22c. In this manner, in the lighting device for vehicle 10, even in a case where unexpected light has been generated, the quantity of the light can be significantly restrained, and dazzling exerted by the unexpected light can be prevented. Accordingly, in the lighting device for vehicle 10, it is also possible to prevent emission from the projection lens 22 of the light deviating from the laws or regulations that are stipulated with respect to the lighting device for vehicle.

In the lighting device for vehicle 10, the lens-side diffusion surface 21h that has been provided on the lens opposing surface 21d of the shading part 21b of the plate member 21 is formed of unevenness which is arranged so as to have a predetermined regularity and thus it is possible to diffuse the light that travels to its own side with a simple configuration and while achieving cost reduction.

Figure 9:
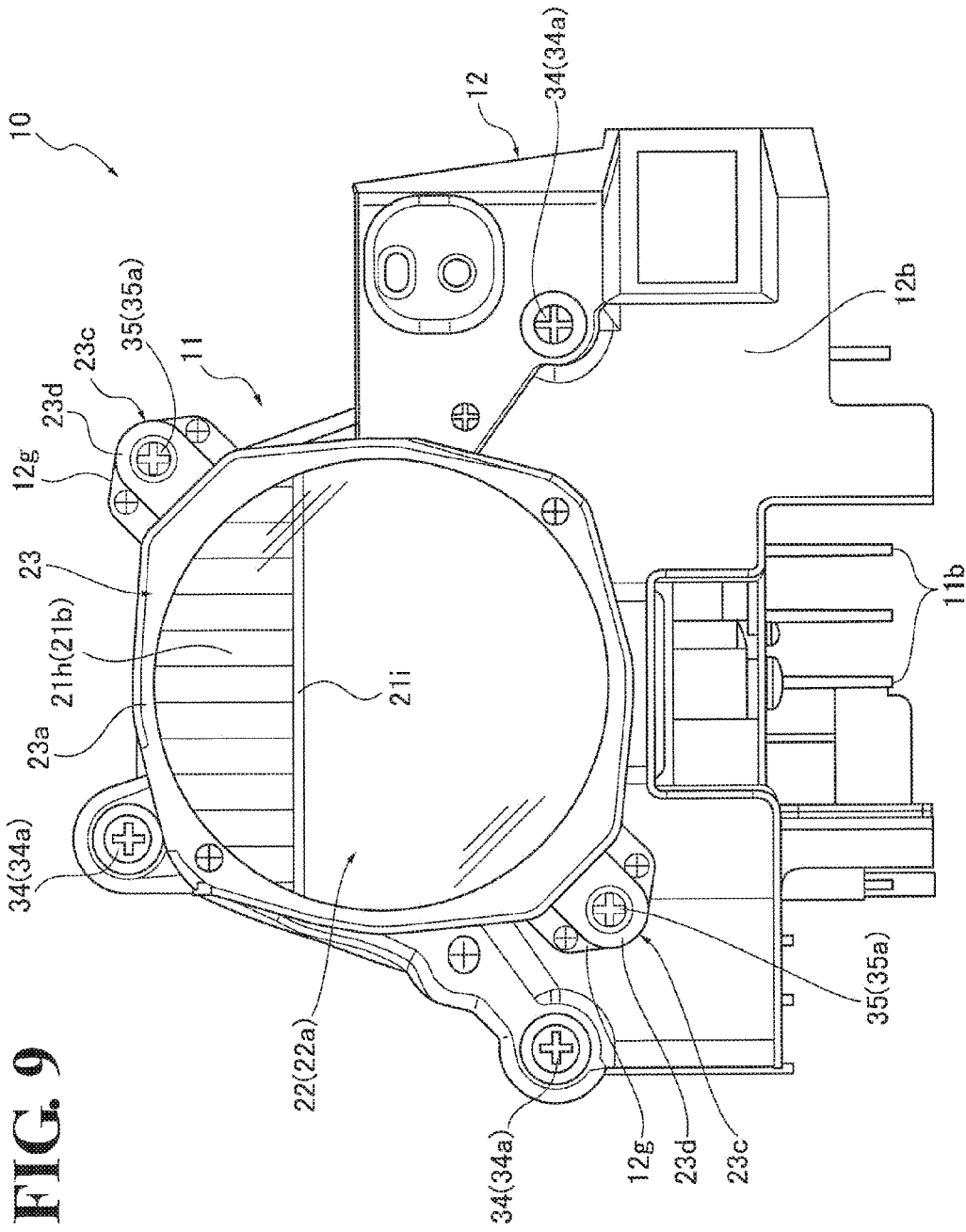
FIG. 9 is a front view showing an appearance in a case where the lighting device for vehicle 10 is seen from a front side in a case where the lighting device is not lit.

In the lighting device for vehicle 10, the lens-side diffusion surface 21h that has been provided on the lens opposing surface 21d of the shading part 21b of the plate member 21 is formed of unevenness which is arranged so as to have a predetermined regularity, the unevenness having a dimensional size which can be visually recognized through the projection lens 22 and thus as shown in FIG. 9, it is possible to form a pattern of unevenness at the depth of the projection lens 22 in a case where the lighting device is not lit, the unevenness being exerted by the lens-side diffusion surface 21h. Thus, in the lighting device for vehicle 10, the appearance in a case in which the lighting device is not lit can be improved with a simple configuration.

In the lighting device for vehicle 10, the lens-side diffusion surface 21h that has been provided on the lens opposing surface 21d of the shading part 21b of the plate member 21 is obtained as a longitudinally patterned roulette and thus it is possible to diffuse the light that travels to its own side with a simpler configuration and while achieving cost reduction.

In the lighting device for vehicle 10, the lens-side diffusion surface 21h that has been provided on the lens opposing surface 21d of the shading part 21b of the plate member 21 is obtained as a longitudinally patterned roulette and thus as shown in FIG. 9, when the lighting device is not lit, a striped pattern can be formed of the lens-side diffusion surface 21h (the longitudinally patterned roulette) at the depth and at the upper part of the projection lens 22. In particular, in the first embodiment, a lower end flat surface 21i is provided downward of the lens-side diffusion surface 21h at the shading part 21b and thus it is possible to form the striped pattern and a linear pattern extending in the transverse direction downward thereof. Thus, in the lighting device for vehicle 10, the appearance in a case where the lighting device is not lit can be improved with a simple configuration.

In the lighting device for vehicle 10, the lens-side diffusion surface 21h that has been provided on the lens opposing surface 21d of the shading part 21b of the plate member 21 is obtained as a longitudinally patterned roulette and thus it is possible to diffuse the light that travels to its own side in the transverse direction without being diffused in the vertical direction. Thus, in the lighting device for vehicle 10, the light that travels to the shading part 21b can be diffused without generating the light (the luminous flux) that may travel upward to thereby cause dazzling; and therefore, it is possible to more reliably prevent the light (the luminous flux) from being emitted from the projection lens 22 to thereby cause dazzling, the light being unrequired in terms of light distribution due to provision of the shading part 21b at the plate member 21.

In the lighting device for vehicle 10, the plate member 21 is formed of a member of which thermal conductivity is lower than that of the lens holder 12 and of which heat resistance is higher than that of the projection lens 22. Thus, in the lighting device for vehicle 10, it is possible to more reliably prevent lowering of the accuracy of mounting of the projection lens 22 to be mounted to the lens holder 12 via the plate member 21.

In the lighting device for vehicle 10, by the second protrusion parts 12d, the gap C1 is provided between the lens holder 12 (the front side end face 12c of the cylindrical part 12a) and the plate member 21 (the light source side surface 21c of the annular section 21a). Thus, in the lighting device for vehicle 10, a path for transmitting a heat from the lens holder 12 to the plate member 21 can be formed of only each second protrusion parts 12d, thus making it possible to more effectively restrain the heat of the lens holder 12 from being transmitted to the plate member 21. Therefore, in the lighting device for vehicle 10, it is possible to more reliably prevent the projection lens 22 from being deformed due to the heat that has been transmitted through the lens holder 12.

In the lighting device for vehicle 10, by the first protrusion part 21e, the gap C2 is provided between the plate member 21 (the light source side surface 21c of the annular section 21a) and the projection lens 22 (a rear surface 22c of the flange portion 22b). Thus, in the lighting device for vehicle 10, a path for transmitting a heat from the plate member 21 to the projection lens 22 can be formed of only each first protrusion part 21e, thus making it possible to more effectively restrain the heat of the lens holder 12 from being transmitted to the projection lens 22 via the plate member 21. Therefore, in the lighting device for vehicle 10, it is possible to more reliably prevent the projection lens 22 from being deformed due to the heat that has been transmitted through the lens holder 12.

In the lighting device for vehicle 10, the second protrusion parts 12d (the posture determination surface 12e) is provided on the front side end surface 12c of the cylindrical part 12a of the lens holder 12, and the gap C1 is thereby formed between the lens holder 12 (the front side end surface 12c) and the plate member 21 (the light source side surface 21c). Thus, the lighting device for vehicle 10, the gap C1 can be provided between the lens holder 12 (the front side end surface 12c) and the plate member 21 (the light source side surface 21c) with a simple configuration while the accuracy of mounting of the plate member 21 to the lens holder 12 is improved. This is because it is possible to obtain a high accuracy in the case of ensuring that the posture determination surfaces 12e of the plurality of second protrusion parts 12d each are formed of a desired plane in comparison with the case of ensuring that the front side end surface 12c of the lens holder 12 is formed of a desired plane as a whole.

In the lighting device for vehicle 10, by the second protrusion part 12d, the gap C1 is provided between the lens holder 12 (the front side end surface 12c) and the plate member 21 (the light source side surface 21c), so that a pneumatic layer can be formed between the lens holder 12 and the plate member 21 by utilizing the gap C1. Thus, in the lighting device for vehicle 10, the heat of the lens holder 12 can be radiated by the pneumatic layer and heating of the plate member 21 can be effectively restrained. In this manner, in the lighting device for vehicle 10, it is possible to more effectively restrain the heat of the lens holder 12 from being transmitted to the plate member 21.

In the lighting device for vehicle 10, the first protrusion part 21e (the posture determination surface 210 is provided on the lens opposing surface 21d of the annular section 21a of the plate member 21, and the gap C2 is thereby provided between the plate member 21 (the light source side surface 21c) and the projection lens 22 (the back face 22c). Thus, in the lighting device for vehicle 10, the gap C2 can be provided between the plate member 21 (the light source side surface 21c) and the projection lens 22 (the back face 22c) with a simple configuration while the accuracy of mounting of the projection lens 22 to the plate member 21 is improved. In this manner, in the lighting device for vehicle 10, it is possible to improve the accuracy of mounting of the projection lens 22 to the lens holder 12.

In the lighting device for vehicle 10, by the first protrusion part 21e, the gap C2 is provided between the plate member 21 (light source side surface 21c) and the projection lens 22 (the back face 22c), so that the pneumatic layer can be formed between the plate member 21 and the projection lens 22 by utilizing the gap C2. Thus, in the lighting device for vehicle 10, the heat of the plate member 21 can be radiated by the pneumatic layer and heating of the projection lens 22 can be effectively restrained. In this manner, in the lighting device for vehicle 10, it is possible to more effectively restrain the heat of the lens holder 12 from being transmitted to the projection lens 22.

In the lighting device for vehicle 10, the light source side diffusion surface 21m is provided on the light source side surface 21c at the shading part 21b of the plate member 21. Thus, in the lighting device for vehicle 10, by the shading part 21b of the plate member 21, it is possible to prevent the light (the luminous flux) from being emitted from the projection lens 22 to thereby cause dazzling, the light being unrequired in terms of light distribution due to prevention of the light (the luminous flux) that is emitted from the semiconductor light emitting section 13, from directly illuminating an upper side of the upper halved part in the surface that is orthogonal to the emission light axis L. This is due to the fact described below. First, a lighting device for vehicle employing the plate member 21 as a flat surface in which the light source side diffusion surface 21m is not provided on the light source side surface 21c is employed as a lighting device for vehicle 10B (the lighting device for vehicle 10 is employed in the drawing, since they are equal to each other in terms of construction). In the lighting device for vehicle (10B), of the light (the luminous flux) that has been emitted from the semiconductor light emitting section 13, the light (the luminous flux) to be shaded by the shading part 21b of the plate member 21 basically travels to the light source side surface 21c of the shading part 21b. Then, in the lighting device for vehicle (10B), the light (the luminous flux) that has travelled to the light source side surface 21c is reflected by the light source side surface 21c and then the reflected light travels in an unintended direction in the lamp room formed by the lens holder 12. There may be a case in which the light (the luminous flux) is emitted from the projection lens 22 in the unintended direction, and in some cases, there is an apprehension that the light deviates from the laws or regulations that are stipulated with respect to the lighting device for vehicle. On the other hand, in the lighting device for vehicle 10, the light source side diffusion surface 21m is provided on the light source side surface 21c of the shading part 21b, so that the light (the luminous flux) B7 that has travelled to the light source side surface 21c (refer to FIG. 7) can be diffused by the light source side diffusion surface 21m (the light source side surface 21c). Thus, in the lighting device for vehicle 10, unlike the case in which the light is reflected by a flat light source side surface 21c as in the lighting device for vehicle (10B), it is possible to distort the direction in which the light that has been shaded by the shading part 21b travels into the lamp room. In this manner, in the lighting device for vehicle 10, even in a case where the light (the luminous flux) has been shaded by the shading part 21b, it is possible to significantly restrain the light quantity of the light (the luminous flux) that travels in the unintended direction in the lamp room due to the shading, and it is possible to prevent dazzling due to the shading. From this fact, in the lighting device for vehicle 10, it is also possible to prevent the light deviating from the laws or regulations that are stipulated with respect to the lighting device for vehicle from being emitted from the projection lens 22.

In the lighting device for vehicle 10, the light source side diffusion surface 21m is provided substantially all over the light source side surface 21c at the plate member 21. Thus, in the lighting device for vehicle 10, it is possible to significantly restrain the light quantity of the light (the luminous flux) that travels in the unintended direction in the lamp room formed by the lens holder 12 due to the light source (the luminous flux) that has been emitted from the semiconductor light emitting section 13 and that has travelled to the light source side surface 21c of the plate member 21. In this manner, in the lighting device for vehicle 10, while preventing lowering of the accuracy of mounting of the projection lens 22 due to the heat that has been generated at the semiconductor light emitting section 13, it is possible to prevent dazzling due to the fact that the light (the luminous flux) in the unintended direction is emitted from the projection lens 22 by the plate member 21 that has been provided for the sake of the prevention.

In the lighting device for vehicle 10, the light source side diffusion surface 21m that has been provided on the light source side surface 21c of the plate member 21 is obtained as a longitudinally patterned roulette and thus it is possible to prevent the light (the luminous flux) in the unintended direction from being emitted from the projection lens 22 with a simple configuration and while achieving cost reduction.

In the lighting device for vehicle 10, the light source side diffusion surface 21m that has been provided on the light source side surface 21c of the shading part 21b of the plate member 21 is obtained as a longitudinally patterned roulette, so that the light that travels to its own side can be diffused in the transverse direction without being diffused in the vertical direction. Thus, in the lighting device for vehicle 10, it is possible to effectively restrain generation of the light (the luminous flux) that may travelled upward to thereby cause dazzling in spite of the fact that the light has passed downward of the shading part 21b, due to the diffusion in the vertical direction. In this manner, in the lighting device for vehicle 10, it is possible to diffuse the light that travels to the shading part 21b while restraining generation of the light (the luminous flux) that may travel upward to thereby cause dazzling; and therefore, it is possible to prevent the light (the luminous flux) from being emitted from the projection lens 22 to thereby cause dazzling, the light being unrequired in terms of light distribution due to provision of the shading part 21b at the plate member 21.

In the lighting device for vehicle 10, pitches of the longitudinally patterned roulette in the light source side diffusion surface 21m that has been provided on the light source side surface 21c of the plate member 21 are made smaller than pitches of the longitudinally patterned roulette in the lens-side diffusion surface 21h that has been provided on the lens opposing surface 21d of the shading part 21b. Thus, in the lighting device for vehicle 10, unlike the light (the luminous flux) that travels to the lens opposing surface 21d, the light (the luminous flux) of which light quantity is increased by the light being emitted from the semiconductor light emitting section 13 and then directly travelling to the light source side surface 21c of the plate member 21 can be more reliably diffused by the light source side diffusion surface 21m of which pitches have been decreased. In addition, in the lighting device for vehicle 10, with respect to the light (the luminous flux) of which light quantity is decreased by the light being reflected by the back face 22c of the projection lens 22 and travelling to the gap C2, it is possible to sufficiently reduce the light quantity, even on the lens-side diffusion surface 21h of which pitches have been increased, and it is possible to improve the appearance in a case where the lighting device is not lit.

In the lighting device for vehicle 10, the projection lens 22 and the plate member 21 are fixed to the lens holder 12 (the cylindrical part 12a) by means of the fixing frame 23. Thus, in the lighting device for vehicle 10, it is possible to more effectively restrain the heat that has been generated at the semiconductor light emitting section 13 from being transmitted to the plate member 21 or the projection lens 22 in comparison with the case of fixing the plate member 21 or the projection lens 22 to the lens holder 12 (the cylindrical part 12a) by employing an adhesive agent.

In the lighting device for vehicle 10, the plate member 21 is formed in an annular shape, having the shading part 21b and the opening part 21n and thus the opening part 21n is adapted to ensure an optical path in which the light (the luminous flux) that has been emitted from the semiconductor light emitting section 13 reaches the projection lens 22. Thus, in the lighting device for vehicle 10, while the plate member 21 is simply configured, the plate member 21 can be provided between the projection lens 22 and the lens holder 12 (the cylindrical part 12a).

In the lighting device for vehicle 10, the plate member 21 is compatible with a function of effectively restraining the heat that has been transmitted through the lens holder 12 from being transmitted to the projection lens 22 and a function of preventing dazzling exerted by the light that is unrequired in terms of light distribution (the direct light and the light that is not controlled). Thus, the lighting device for vehicle 10 can be simply configured and the projection lens 22 is made of a resin material and further reduction of the weight can be achieved.

Therefore, in the lighting device for vehicle 10 of the first embodiment according to the present invention, even in a case where the projection lens 22 having been formed of a resin material has been employed, it is possible to prevent lowering of the accuracy of mounting due to the heat that is generated at the semiconductor light emitting section 13.

Second Embodiment

Next, a lighting device for vehicle 102 of a second embodiment of the present invention will be described with reference to FIG. 10 and FIG. 11. The lighting device for vehicle 102 of the second embodiment is an exemplary device in which a configuration of a plate member 212 is different from that of the plate member 21 of the first embodiment. The lighting device for vehicle 102 of the second embodiment is similar to the lighting device for vehicle 10 of the first embodiment described above in terms of basic configuration and thus the same constituent elements are designated by the same reference numerals, and hereinafter, a detailed description thereof is omitted.

Figure 10:
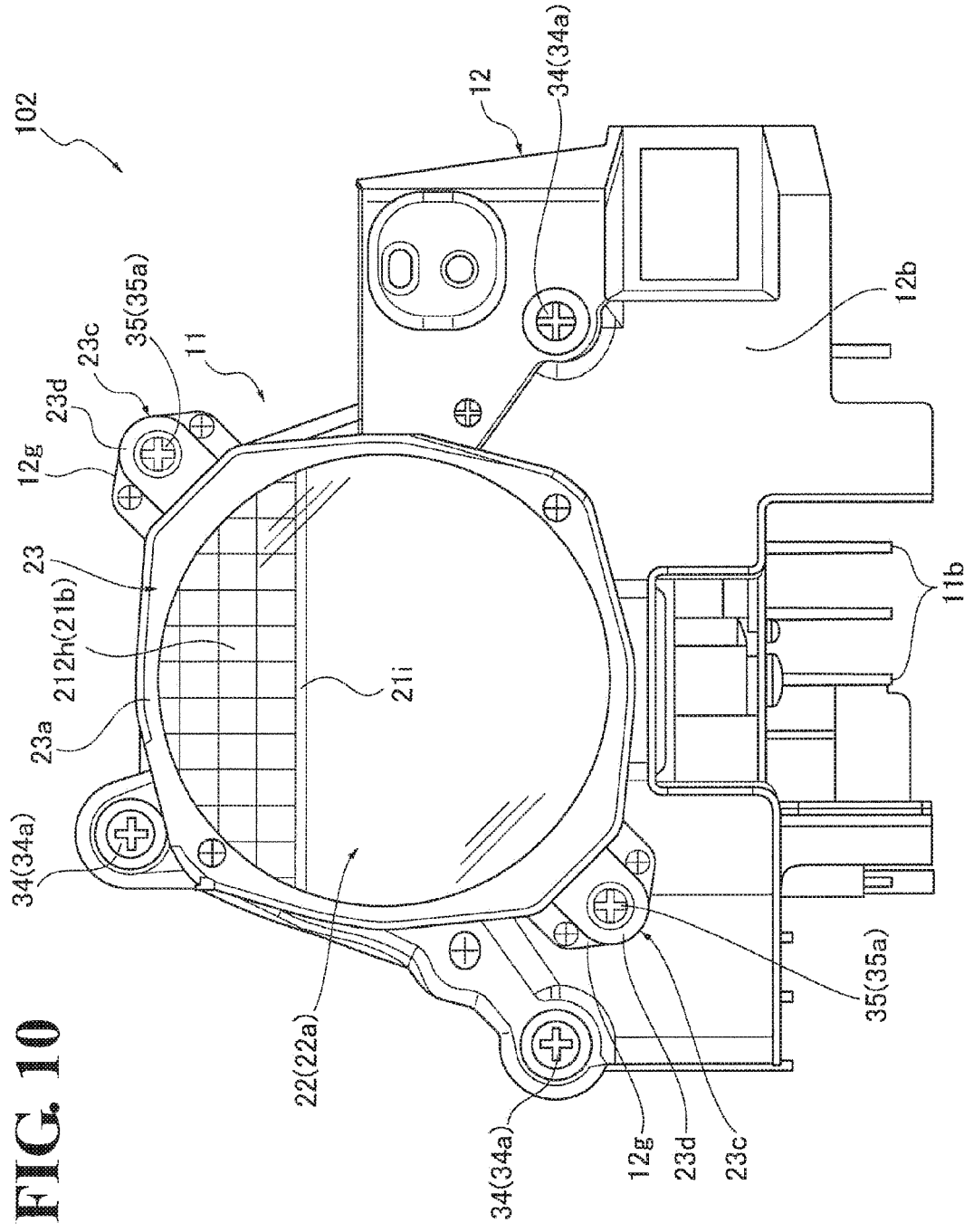
FIG. 10 is a front view showing an appearance in a case where a lighting device for vehicle 102 of a second embodiment according to the present invention is seen from a front side in a case where the lighting device is not lit.
Figure 11:
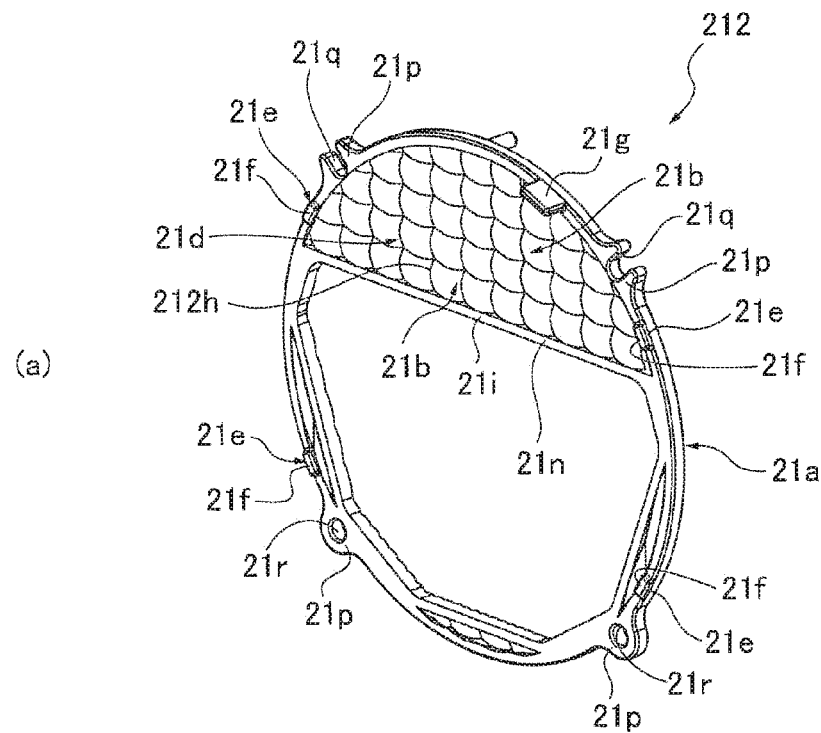
FIG. 11 is an explanatory view, which is similar to FIG. 5, for explaining a configuration of a plate member 212 which is employed in the lighting device for vehicle 102, wherein FIG. 11 (a) is a perspective view showing an appearance in a case where the plate member is seen from the lens opposing surface 21d side, and FIG. 11 (b) is a perspective view showing an appearance in a case where the plate member is seen from the light source side surface 21c side.
Figure 11:
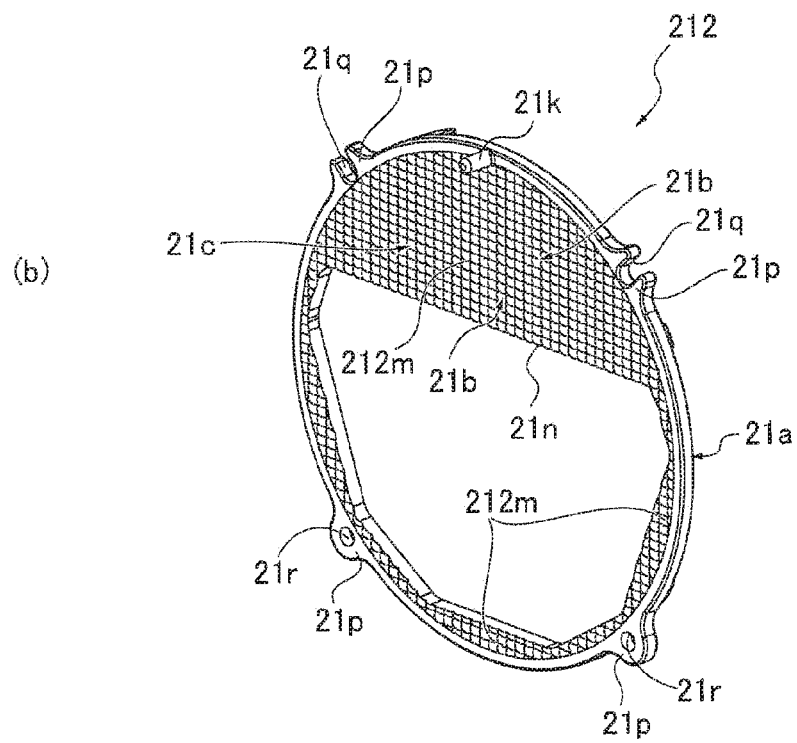

In the lighting device for vehicle 102 of the second embodiment, as shown in FIG. 10 and FIG. 11, a lens side diffusion surface 212h and a light source side diffusion surface 212m in the plate member 212 are formed of a plurality of fisheye shaped sections. In more detail, in the plate member 212, a lens-side diffusion surface 212h is provided at the shading part 21b in the lens opposing surface 21d (refer to FIG. 11 (a)). The lens-side diffusion surface 212h is formed by overlapping a protrusive striped part extending in the transverse direction while protruding in an arc shape towards a front side on a protrusive stripped part extending in the vertical direction while protruding in an arc shape towards a front side. Thus, the lens-side diffusion surface 212h is configured so that the plurality of fisheye shaped section are arrayed in a lattice shape. Incidentally, in so far as the lens-side diffusion surface 212h, is concerned, it is sufficient if the shape of each fisheye shaped section when it is seen in a cross section which is orthogonal to the vertical direction and the transverse direction is appropriately set, without being limitative to the configuration of the second embodiment. Also, in so far as the lens-side diffusion surface 212h is concerned, it is sufficient if the direction in which the plurality of fisheye shaped sections are arrayed in the lattice shape is appropriately set, without being limitative to the configuration of the second embodiment.

In addition, in the plate member 212, a light source side diffusion surface 212m is provided on the light source side surface 21c, that is, substantially all over the light source side surface 21c at the annular section 21a and the shading part 21b (refer to FIG. 11 (b)). The light source side diffusion surface 212m is formed by overlapping a protrusive striped part extending in the transverse direction while protruding in an arc shape towards a rear side on a protrusive striped part extending in the vertical direction while protruding in an arc shape towards a rear side. Thus, the light source side diffusion surface 212m, like the lens-side diffusion surface 212h, is configured so that the plurality of fisheye shaped sections are arrayed in the lattice shape. In addition, in so far as the light source side diffusion surface 212m is concerned, the respective fisheye shaped sections are provided in pitches which are finer than those of the lens-side diffusion surface 212h. Incidentally, in so far as the light source side diffusion surface 212m is concerned, it is sufficient if the shape of each fisheye shaped section when it is seen in a cross section which is orthogonal to the vertical direction and the transverse direction is appropriately set, without being limitative to the configuration of the second embodiment.

In addition, in so far as the light source side diffusion surface 212m is concerned, it is sufficient if the direction in which the plurality of fisheye shaped sections are arrayed in the lattice shape is appropriately set, and is limited to that of the second embodiment.

The lighting device for vehicle 102 of the second embodiment basically has a similar configuration to that of the lighting device for vehicle 10 of the first embodiment and thus the similar advantageous effects to those of the first embodiment can be attained.

In addition to the above, in the lighting device for vehicle 102 of the second embodiment, the plurality of fisheye shaped sections are arrayed in the lattice shape on the lens-side diffusion surface 212h that has been provided on the lens opposing surface 21d of the shading part 21b of the plate member 212. Thus, in the lighting device for vehicle 102, as shown in FIG. 10, the appearance in a case where the lighting device is not lit can be improved with a simple configuration and an impression which is different from that of the lighting device for vehicle 10 of the first embodiment can be imparted.

Therefore, in the lighting device for vehicle 102 of the second embodiment according to the present invention, even in a case where the projection lens 22 having been formed of a resin material has been employed, it is possible to prevent lowering of the accuracy of mounting exerted by the heat that is generated at the semiconductor light emitting section 13.

Incidentally, although in the foregoing embodiments, the lighting devices for vehicle 10, 102 each was described as an example of the lighting device for vehicle, according to the present invention, it is sufficient that there is a lighting device for vehicle, comprising: a semiconductor light emitting section; a projection lens to radiate the light that has been emitted from the semiconductor light emitting section in a predetermined light distribution pattern; a heat sink member to which the semiconductor light emitting section is to be mounted; and a plate member which is provided between the projection lens and the heat sink member and of which thermal conductivity is lower than that of the heat sink member, and the projection lens is a resin lens, and in so far as the plate member is concerned, it is sufficient if at least a part of the lens opposing surface that opposes to the projection lens is obtained as a lens-side diffusion surface, without being limitative to the configuration of each of the foregoing embodiments.

In addition, in each of the foregoing embodiments, the shading part 21b was provided at each of the plate members 21, 212. However, it is sufficient if the plate member has a thermal conductivity which is lower than that of the heat sink member 11 for radiating the heat that has been generated at the semiconductor light emitting section 13, and is provided between the heat sink member 11 and the projection lens 22, without being limitative to the configuration of each of the foregoing embodiments.

Further, in each of the foregoing embodiments, the lens-side diffusion surface 21h was obtained as a longitudinally patterned roulette, and the lens-side diffusion surface 212h was formed by arraying the plurality of eye formed sections in the lattice shape. However, it is sufficient if the lens-side diffusion surface diffuses the light (the luminous flux) that has travelled to its own side, without being limitative to the configuration of each of the foregoing embodiments.

In each of the foregoing embodiments, the lens-side diffusion surface 21h was provided on the lens opposing surface 21d of the shading part 21b of each of the plate members 21, 212. However, it may be that the lens-side diffusion surface is provided all over the lens opposing surface 21d, is provided at another part, or alternatively, is not provided, without being limitative to each of the foregoing embodiments.

In each of the foregoing embodiments, the second protrusion parts 12d forming a gap C1 between each of the plate members 21, 212 and the lens holder 12 was provided at the lens holder 12 (the front side end surface 12c of the cylindrical part 12a). However, the second protrusion parts 12d may be provided at each of the plate members 21, 212 (the light source side surface 21c) as long as the gap C1 is formed between each of the plate members 21, 212 and the lens holder 12, without being limitative to each of the foregoing embodiments.

In each of the foregoing embodiments, the lens holder 12 to retain the projection lens 22 was configured to be mounted to the heat sink member 11 in order to provide the shade 17 in the optical path from the semiconductor light emitting section 13 up to the projection lens 22. However, in place of providing the lens holder 12, the projection lens 22 may be configured to be mounted to the heat sink member 11 via each of the plate members 21, 212, without being limitative to each of the foregoing embodiments. That is, there may be a configuration in which the shade 17 is not provided, or alternatively, there may be a configuration in which the shade 17 is fixedly provided, without being limitative to each of the foregoing embodiments.

In each of the foregoing embodiments, between each of the plate members 21, 212 and the projection lens 22, the first protrusion part 21e forming the gap C2 was provided at each of the plate members 21, 212 (the lens opposing surface 21d of the annular section 21a). However, the first protrusion part 21e may be provided on the projection lens 22 (the back face 22c of the flange section 22b) as long as the gap C2 is formed between each of the plate members 21, 212 and the projection lens 22, without being limitative to each of the foregoing embodiments.

In each of the foregoing embodiments, each of the light source side diffusion surfaces 21m, 212m was respectively provided all over the light source side surface 21c of each of the plate members 21, 212. However, it may be that the light source side diffusion surface is or is not provided on a part of the light source side surface 21c (for example, the shading part 21b), without being limitative to each of the foregoing embodiments.

In each of the foregoing embodiments, the plate members 21, 212 each form an annular shape. However, it may be that the plate member has a thermal conductivity which is lower than that of the heat sink member 11 for radiating the heat that has been generated at the semiconductor light emitting section 13 and is provided between the heat sink member 11 and the projection lens 22, without being limitative to the configuration of each of the foregoing embodiments.

In each of the foregoing embodiments, the two guiding protrusions 12f that were provided on the front side end surface 12c of the cylindrical part 12a of the lens holder 12 were passed through the guiding groove 21q or the guiding hole 21r of the corresponding guiding piece 21p in each of the plate members 21, 212 to thereby determine the position of each of the plate members 21, 212 with respect to the lens holder 12 and prevent an occurrence of displacement. However, as long as it is possible to determine the position of each of the plate members 21, 212 with respect to the lens holder 12 and to prevent the occurrence of displacement, for example, each of the plate members 21, 212 (the annular section 21a) may be pressed at least at three parts from the outside in the radial direction, or alternatively, another configuration may be employed, without being limitative to each of the foregoing embodiments.

In each of the foregoing embodiments, the lighting device for vehicle 10, which is employed as a headlamp for vehicle (headlamp), was shown. However, the lighting device for vehicle, according to the present invention, for example, may be provided as an auxiliary lamp for auxiliary forming a light distribution pattern in the headlamp; may be provided as a fag lamp; or alternatively, may be another lamp employed for vehicle, without being limitative to the construction of each of the foregoing embodiments.

Although the lighting device for vehicle, of the present invention, has been described based on each of the embodiments, a specific configuration is not limitative to each of the embodiments, and a design modification or addition or the like is permissible without deviating from the spirit of the present invention.

The invention claimed is:

1. A lighting device for a vehicle, comprising:
   a semiconductor light emitting section;
   a projection lens arranged to radiate, as a predetermined light distribution pattern, light emitted from the semiconductor light emitting section;
   a heat sink member to which the semiconductor light emitting section is to be mounted; and
   a plate member which is interposed between the projection lens and the heat sink member in an optical axis direction of the projection lens and has thermal conductivity lower than thermal conductivity of the heat sink member;
   wherein the projection lens is a resin lens,
   the plate member is arranged such that at least a part of a lens opposing surface of the plate member which opposes the projection lens is provided as a diffusion surface and a shading part to partially shade the light emitted from the semiconductor light emitting section provided to the plate member, the plate member having an annular section with an inner opening, the shading part arranged in only a portion of the inner opening, an opening part arranged in a remaining portion of the inner opening such that light emitted from the semiconductor light emitting section passes through the opening part without passing through a material of the plate number.

2. The lighting device for a vehicle, according to claim 1, wherein the lens opposing surface is provided as the diffusion surface at the shading part.

3. The lighting device for a vehicle, according to claim 1, wherein the diffusion surface of the lens opposing surface is a longitudinally patterned roulette.

4. The lighting device for a vehicle, according to claim 1, wherein the diffusion surface of the lens opposing surface is configured so that a plurality of fisheye shaped sections are arrayed in a lattice shape.

5. The lighting device for a vehicle, according to claim 1, wherein, at either one of the plate member and the projection lens, a first protrusion part to form a gap between the plate member and the projection lens is provided.

6. The Lighting device for a vehicle, according to claim 1, wherein, to the heat sink member, a lens holder to hold the projection lens while a shade is provided in an optical path from the semiconductor light emitting section up to the projection lens is mounted, and the plate member is disposed between the projection lens and the lens holder so as to be thereby provided between the projection lens and the heat sink member.

7. The lighting device for a vehicle, according to claim 6, wherein, the plate member is arranged such that a light source side surface thereof which is positioned at the semiconductor light emitting section side is provided as a diffusion surface.

8. The lighting device for a vehicle, according to claim 1, wherein the plate member has:
a shading part to shade the light from the semiconductor light emitting section, and
an opening part to radiate the light from the semiconductor light emitting section to a front side via the projection lens, and the plate member forms an annular shape.

9. The lighting device for a vehicle, according to claim 6, wherein, at either one of the plate member and the lens holder, a second protrusion part to form a gap between the plate member and the lens holder is provided.

* * * * *